(12) United States Patent
Harrold et al.

(10) Patent No.: US 11,809,052 B2
(45) Date of Patent: **\*Nov. 7, 2023**

(54) STABILIZATION FOR PRIVACY DISPLAY

(71) Applicant: RealD Spark, LLC, Beverly Hills, CA (US)

(72) Inventors: Jonathan Harrold, Leamington Spa (GB); Graham J. Woodgate, Henley on Thames (GB); Robert Ramsey, Boulder, CO (US)

(73) Assignee: RealD Spark, LLC, Boulder, CO (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/372,059

(22) Filed: Jul. 9, 2021

(65) Prior Publication Data

US 2021/0405403 A1    Dec. 30, 2021

Related U.S. Application Data

(63) Continuation of application No. 16/448,555, filed on Jun. 21, 2019, now Pat. No. 11,079,645.

(Continued)

(51) Int. Cl.
*G02F 1/137* (2006.01)
*G02F 1/13363* (2006.01)
(Continued)

(52) U.S. Cl.
CPC ........... *G02F 1/137* (2013.01); *G02B 6/0038* (2013.01); *G02B 6/0055* (2013.01); *G02F 1/139* (2013.01); *G02F 1/1323* (2013.01); *G02F 1/1337* (2013.01); *G02F 1/13338* (2013.01); *G02F 1/13363* (2013.01); *G02F 1/13439* (2013.01);
(Continued)

(58) Field of Classification Search
None
See application file for complete search history.

(56) References Cited

U.S. PATENT DOCUMENTS 3,914,022 A    10/1975  Kashnow
4,059,916 A    11/1977  Tachihara et al.
(Continued)

FOREIGN PATENT DOCUMENTS

CA    2222313 A1    6/1998
CN    1125943 C     10/2003
(Continued)

OTHER PUBLICATIONS

Adachi, et al. "P-228L: Late-News Poster: Controllable Viewing-Angle Displays using a Hybrid Aligned Nematic Liquid Crystal Cell", ISSN, SID 2006 Digest, pp. 705-708.
(Continued)

*Primary Examiner* — Shan Liu
(74) *Attorney, Agent, or Firm* — Penny L. Lowry

(57) ABSTRACT

A display comprises a polarised output spatial light modulator, switchable liquid crystal retarder, absorbing polarizer and touch panel electrodes. The switchable liquid crystal layer is stabilised by a cured reactive mesogen material during application of an applied voltage. Light scatter in privacy mode is reduced and visual security level enhanced. Visibility of disclinations during application of applied pressure, for example from a finger on a touch screen is minimised.

17 Claims, 32 Drawing Sheets

Related U.S. Application Data

(60) Provisional application No. 62/691,896, filed on Jun. 29, 2018, provisional application No. 62/789,322, filed on Jan. 7, 2019, provisional application No. 62/796,423, filed on Jan. 24, 2019.

(51) Int. Cl.
*G02F 1/13* (2006.01)
*G02F 1/1333* (2006.01)
*G02F 1/1335* (2006.01)
*F21V 8/00* (2006.01)
*G02F 1/1337* (2006.01)
*G02F 1/1343* (2006.01)
*G02F 1/139* (2006.01)
*G06F 3/044* (2006.01)

(52) U.S. Cl.
CPC .. *G02F 1/133504* (2013.01); *G02F 1/133528* (2013.01); *G02F 1/133536* (2013.01); *G02F 1/133634* (2013.01); *G02F 1/13706* (2021.01); *G02F 1/13712* (2021.01); *G02F 1/13725* (2013.01); *G02F 1/13775* (2021.01); *G02F 1/133531* (2021.01); *G02F 1/133738* (2021.01); *G02F 1/133742* (2021.01); *G02F 2413/14* (2013.01); *G06F 3/0445* (2019.05)

(56) References Cited

U.S. PATENT DOCUMENTS

| | | | |
|---|---|---|---|
| 4,586,790 A | 5/1986 | Umeda et al. | |
| 4,621,898 A | 11/1986 | Cohen | |
| 4,974,941 A | 12/1990 | Gibbons et al. | |
| 5,005,108 A | 4/1991 | Pristash et al. | |
| 5,035,491 A | 7/1991 | Kawagishi et al. | |
| 5,126,882 A | 6/1992 | Oe et al. | |
| 5,608,550 A | 3/1997 | Epstein et al. | |
| 5,658,490 A | 8/1997 | Sharp et al. | |
| 5,671,994 A | 9/1997 | Tai et al. | |
| 5,715,028 A | 2/1998 | Abileah et al. | |
| 5,779,337 A | 7/1998 | Saito et al. | |
| 5,791,757 A | 8/1998 | O'Neil et al. | |
| 5,808,784 A | 9/1998 | Ando et al. | |
| 5,835,166 A | 11/1998 | Hall et al. | |
| 5,852,509 A | 12/1998 | Coleman | |
| 5,854,872 A | 12/1998 | Tai | |
| 5,894,361 A | 4/1999 | Yamazaki et al. | |
| 5,914,760 A | 6/1999 | Daiku | |
| 5,997,148 A | 12/1999 | Ohkawa | |
| 6,055,103 A | 4/2000 | Woodgate et al. | |
| 6,099,758 A | 8/2000 | Verrall et al. | |
| 6,144,433 A | 11/2000 | Tillin et al. | |
| 6,169,589 B1 | 1/2001 | Kaneko | |
| 6,204,904 B1 | 3/2001 | Tillin et al. | |
| 6,222,672 B1 | 4/2001 | Towler et al. | |
| 6,280,043 B1 | 8/2001 | Ohkawa | |
| 6,364,497 B1 | 4/2002 | Park et al. | |
| 6,379,016 B1 | 4/2002 | Boyd et al. | |
| 6,392,727 B1 | 5/2002 | Larson et al. | |
| 6,437,915 B2 | 8/2002 | Moseley et al. | |
| 6,731,355 B2 | 5/2004 | Miyashita | |
| 6,752,505 B2 | 6/2004 | Parker et al. | |
| 6,987,550 B2 | 1/2006 | Takato et al. | |
| 7,067,985 B2 | 6/2006 | Adachi | |
| 7,072,096 B2 | 7/2006 | Holman et al. | |
| 7,163,319 B2 | 1/2007 | Kuo et al. | |
| 7,227,602 B2 | 6/2007 | Jeon et al. | |
| 7,366,392 B2 | 4/2008 | Honma et al. | |
| 7,524,542 B2 | 4/2009 | Kim et al. | |
| 7,528,893 B2 | 5/2009 | Schultz et al. | |
| 7,528,913 B2 | 5/2009 | Kobayashi | |
| 7,633,586 B2 | 12/2009 | Winlow et al. | |
| 7,660,047 B1 | 2/2010 | Travis et al. | |
| 7,766,534 B2 | 8/2010 | Iwasaki | |
| 7,834,834 B2 | 11/2010 | Takatani et al. | |
| 7,970,246 B2 | 6/2011 | Travis et al. | |
| 7,991,257 B1 | 8/2011 | Coleman | |
| 8,070,346 B2 | 12/2011 | Maeda et al. | |
| 8,098,350 B2 | 1/2012 | Sakai et al. | |
| 8,154,686 B2 | 4/2012 | Mather et al. | |
| 8,228,476 B2 | 7/2012 | Shibazaki | |
| 8,237,876 B2 | 8/2012 | Tan et al. | |
| 8,249,408 B2 | 8/2012 | Coleman | |
| 8,262,271 B2 | 9/2012 | Tillin et al. | |
| 8,469,575 B2 | 6/2013 | Weber et al. | |
| 8,646,931 B2 | 2/2014 | Choi et al. | |
| 8,801,260 B2 | 8/2014 | Urano et al. | |
| 8,848,132 B2 | 9/2014 | O'Neill et al. | |
| 8,939,595 B2 | 1/2015 | Choi et al. | |
| 8,973,149 B2 | 3/2015 | Buck | |
| 9,195,087 B2 | 11/2015 | Terashima | |
| 9,274,260 B2 | 3/2016 | Urano et al. | |
| 9,304,241 B2 | 4/2016 | Wang et al. | |
| 9,324,234 B2 | 4/2016 | Ricci et al. | |
| 9,448,355 B2 | 9/2016 | Urano et al. | |
| 9,501,036 B2 | 11/2016 | Kang et al. | |
| 9,519,153 B2 | 12/2016 | Robinson et al. | |
| 9,541,698 B2 | 1/2017 | Wheatley et al. | |
| 9,798,169 B2 | 10/2017 | Su et al. | |
| 10,054,732 B2 | 8/2018 | Robinson et al. | |
| 10,067,726 B2 | 9/2018 | Wakamoto et al. | |
| 10,126,575 B1 | 11/2018 | Robinson et al. | |
| 10,146,093 B2 | 12/2018 | Sakai et al. | |
| 10,216,018 B2 | 2/2019 | Fang et al. | |
| 10,288,914 B2 | 5/2019 | Chung et al. | |
| 10,303,030 B2 | 5/2019 | Robinson et al. | |
| 10,401,638 B2 | 9/2019 | Robinson et al. | |
| 10,424,232 B2 | 9/2019 | Schubert et al. | |
| 10,488,705 B2 | 11/2019 | Xu et al. | |
| 10,527,775 B2 | 1/2020 | Yang et al. | |
| 10,627,670 B2 | 4/2020 | Robinson et al. | |
| 10,649,248 B1 | 5/2020 | Jiang et al. | |
| 10,649,259 B2 | 5/2020 | Lee et al. | |
| 10,712,608 B2 | 7/2020 | Robinson et al. | |
| 10,802,356 B2 | 10/2020 | Harrold et al. | |
| 10,935,714 B2 | 3/2021 | Woodgate et al. | |
| 10,948,648 B2 | 3/2021 | Ihas et al. | |
| 10,976,578 B2 | 4/2021 | Robinson et al. | |
| 11,016,341 B2 | 5/2021 | Robinson et al. | |
| 11,070,791 B2 | 7/2021 | Woodgate et al. | |
| 11,079,645 B2 * | 8/2021 | Harrold | G02F 1/139 |
| 11,079,646 B2 | 8/2021 | Robinson et al. | |
| 11,092,851 B2 | 8/2021 | Robinson et al. | |
| 11,099,433 B2 | 8/2021 | Robinson et al. | |
| 11,099,448 B2 | 8/2021 | Woodgate et al. | |
| 11,237,417 B2 | 2/2022 | Woodgate et al. | |
| 11,327,358 B2 | 5/2022 | Robinson et al. | |
| 11,366,358 B2 | 6/2022 | Wu et al. | |
| 11,442,316 B2 | 9/2022 | Woodgate et al. | |
| 2001/0024561 A1 | 9/2001 | Cornelissen et al. | |
| 2002/0015300 A1 | 2/2002 | Katsu et al. | |
| 2002/0024529 A1 | 2/2002 | Miller et al. | |
| 2002/0171793 A1 | 11/2002 | Sharp et al. | |
| 2003/0030764 A1 | 2/2003 | Lee | |
| 2003/0058381 A1 | 3/2003 | Shinohara et al. | |
| 2003/0089956 A1 | 5/2003 | Allen et al. | |
| 2003/0107686 A1 | 6/2003 | Sato et al. | |
| 2003/0117792 A1 | 6/2003 | Kunimochi et al. | |
| 2003/0169499 A1 | 9/2003 | Bourdelais et al. | |
| 2003/0214615 A1 | 11/2003 | Colgan et al. | |
| 2003/0222857 A1 | 12/2003 | Abileah | |
| 2004/0015729 A1 | 1/2004 | Elms et al. | |
| 2004/0100598 A1 | 5/2004 | Adachi et al. | |
| 2004/0125430 A1 | 7/2004 | Kasajima et al. | |
| 2004/0141107 A1 | 7/2004 | Jones | |
| 2004/0145703 A1 | 7/2004 | O'Connor et al. | |
| 2004/0223094 A1 | 11/2004 | Hamada et al. | |
| 2004/0240777 A1 | 12/2004 | Woodgate et al. | |
| 2004/0264910 A1 | 12/2004 | Suzuki et al. | |
| 2005/0002174 A1 | 1/2005 | Min et al. | |
| 2005/0111100 A1 | 5/2005 | Mather et al. | |
| 2005/0117186 A1 | 6/2005 | Li et al. | |
| 2005/0135116 A1 | 6/2005 | Epstein et al. | |

(56) References Cited

U.S. PATENT DOCUMENTS

| | | |
|---|---|---|
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1* | 11/2006 | Jeon ............... G02F 1/1393 349/119 |
| 2006/0262255 A1 | 11/2006 | Wang et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1* | 12/2006 | Kobayashi ......... G02F 1/13471 349/117 |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1* | 12/2008 | Fukushima ......... G02F 1/13471 345/87 |
| 2009/0009894 A1 | 1/2009 | Chuang |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1* | 8/2014 | Schwartz ............. B32B 3/30 349/12 |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0035872 A1 | 2/2015 | Shima et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |

(56) References Cited

U.S. PATENT DOCUMENTS

| | | |
|---|---|---|
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1* | 6/2016 | Kim ................ G02F 1/134363 349/33 |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1* | 4/2018 | Fang ................ G02F 1/133528 |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1* | 12/2018 | Finnemeyer ............ C09K 19/56 |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1* | 6/2019 | Chen ................ G02F 1/133536 |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0033898 A1 | 2/2021 | Woodgate et al. |
| 2021/0116627 A1 | 4/2021 | Tsuji |
| 2021/0149233 A1 | 5/2021 | Robinson et al. |
| 2021/0373382 A1 | 12/2021 | Sakai et al. |

FOREIGN PATENT DOCUMENTS

| | | |
|---|---|---|
| CN | 1776484 A | 5/2006 |
| CN | 101042449 A | 9/2007 |
| CN | 101256251 A | 9/2008 |
| CN | 101454712 A | 6/2009 |
| CN | 101518095 A | 8/2009 |
| CN | 101681061 A | 3/2010 |
| CN | 103473494 A | 12/2013 |
| CN | 103688211 A | 3/2014 |
| CN | 104133292 A | 11/2014 |
| CN | 104303085 A | 1/2015 |
| CN | 104321686 A | 1/2015 |
| CN | 104380177 A | 2/2015 |
| CN | 204740413 U | 11/2015 |
| CN | 105842909 A | 8/2016 |
| CN | 106104372 A | 11/2016 |
| CN | 106415342 A | 2/2017 |
| CN | 209171779 U | 7/2019 |
| EP | 1956423 A1 | 8/2008 |
| EP | 2037318 A1 | 3/2009 |
| GB | 2405542 A | 3/2005 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |
| JP | H11174489 A | 7/1999 |
| JP | 2005316470 A | 11/2005 |
| JP | 2005345799 A | 12/2005 |
| JP | 2006139160 A | 6/2006 |
| JP | 2007501966 A | 2/2007 |
| JP | 2007148279 A | 6/2007 |
| JP | 2007273288 A | 10/2007 |
| JP | 2009200293 A | 1/2009 |
| JP | 2011103241 A | 5/2011 |
| JP | 2014032953 A | 2/2014 |
| JP | 2014099363 A | 5/2014 |
| KR | 20120011228 A | 2/2012 |
| KR | 20130046116 A | 5/2013 |
| KR | 1020150021937 A | 3/2015 |
| KR | 1020170013915 A | 2/2017 |
| KR | 1020170040565 A | 4/2017 |
| KR | 101990286 B1 | 6/2019 |
| TW | M537663 U | 3/2017 |
| TW | I612360 B | 1/2018 |
| WO | 2005071449 A2 | 8/2005 |
| WO | 2006030702 A1 | 3/2006 |
| WO | 2008001896 A1 | 1/2008 |
| WO | 2008078764 A1 | 7/2008 |
| WO | 2008093445 A1 | 8/2008 |
| WO | 2009008406 A1 | 1/2009 |
| WO | 2009011199 A1 | 1/2009 |
| WO | 2010021926 A2 | 2/2010 |
| WO | 2010143705 A1 | 12/2010 |
| WO | 2014011328 A1 | 1/2014 |
| WO | 2014130860 A1 | 8/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |

(56) References Cited

FOREIGN PATENT DOCUMENTS

| WO | 2016195786 A1 | 12/2016 |
|---|---|---|
| WO | 2017050631 A1 | 3/2017 |
| WO | 2017117570 A1 | 7/2017 |
| WO | 2018035492 A1 | 2/2018 |
| WO | 2018178790 A1 | 10/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |
| WO | 2021003383 A1 | 1/2021 |

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

CN201780030715.3 Notification of the First Office Action dated Jan. 21, 2020.

CN201880042320.X Notification of the First Office Action dated May 25, 2021.

EP-16860628.3 Extended European Search Report of European Patent Office dated Apr. 26, 2019.

EP-17799963.8 Extended European Search Report of European Patent Office dated Oct. 9, 2019.

EP-18855604.7 Extended European Search Report of European Patent Office dated Jun. 1, 2021.

EP-18857077.4 Extended European Search Report of European Patent Office dated Jun. 16, 2021.

Gass, et al. "Privacy LCD Technology for Cellular Phones", Sharp Laboratories of Europe Ltd, Mobile LCD Group, Feb. 2007, pp. 45-49.

Ishikawa, T., "New Design for a Highly Collimating Turning Film", SID 06 Digest, pp. 514-517.

Kalantar, et al. "Backlight Unit With Double Surface Light Emission," J. Soc. Inf. Display, vol. 12, Issue 4, pp. 379-387 (Dec. 2004).

PCT/US2016/058695 International search report and written opinion of the international searching authority dated Feb. 28, 2017.

PCT/US2017/032734 International search report and written opinion of the international searching authority dated Jul. 27, 2017.

PCT/US2018/031206 International search report and written opinion of the international searching authority dated Jul. 20, 2018.

PCT/US2018/031218 International search report and written opinion of the international searching authority dated Jul. 19, 2018.

PCT/US2018/051021 International search report and written opinion of the international searching authority dated Nov. 21, 2018.

PCT/US2018/051027 International search report and written opinion of the international searching authority dated Nov. 30, 2018.

PCT/US2018/053328 International search report and written opinion of the international searching authority dated Nov. 30, 2018.

PCT/US2018/059249 International search report and written opinion of the international searching authority dated Jan. 3, 2019.

PCT/US2018/059256 International search report and written opinion of the international searching authority dated Jan. 3, 2019.

PCT/US2019/014889 International search report and written opinion of the international searching authority dated May 24, 2019.

PCT/US2019/014902 International search report and written opinion of the international searching authority dated Jun. 25, 2019.

PCT/US2019/023659 International search report and written opinion of the international searching authority dated Jun. 10, 2019.

PCT/US2019/038409 International search report and written opinion of the international searching authority dated Sep. 19, 2019.

PCT/US2019/038466 International search report and written opinion of the international searching authority dated Nov. 5, 2019.

PCT/US2019/042027 International search report and written opinion of the international searching authority dated Oct. 15, 2019.

PCT/US2019/054291 International search report and written opinion of the international searching authority dated Jan. 6, 2020.

PCT/US2019/059990 International search report and written opinion of the international searching authority dated Feb. 28, 2020.

PCT/US2019/066208 International search report and written opinion of the international searching authority dated Feb. 27, 2020.

PCT/US2020/017537 International search report and written opinion of the international searching authority dated Apr. 29, 2020.

PCT/US2020/040686 International search report and written opinion of the international searching authority dated Nov. 20, 2020.

PCT/US2020/044574 International search report and written opinion of the international searching authority dated Oct. 21, 2020.

PCT/US2020/053863 International search report and written opinion of the international searching authority dated Mar. 12, 2021.

PCT/US2020/060155 International search report and written opinion of the international searching authority dated Feb. 5, 2021.

PCT/US2020/060191 International search report and written opinion of the international searching authority dated Feb. 8, 2021.

PCT/US2020/063638 International search report and written opinion of the international searching authority dated Mar. 2, 2021.

PCT/US2020/064633 International search report and written opinion of the international searching authority dated Mar. 15, 2021.

Robson, et al. "Spatial and temporal contrast-sensitivity functions of the visual system", J. Opt. Soc. Amer., vol. 56, pp. 1141-1142 (1966).

Simonyan et al., "Very Deep Convolutional Networks For Large-Scale Image Recognition", ICLR 2015.

Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.

EP-19881483.2 Extended European Search Report of European Patent Office dated Aug. 5, 2022.

JP2020-509511 Non-Final Notice of Reasons for Rejection dated Jul. 19, 2022.

Nelkon et al., "Advanced Level Physics", Third edition with SI units, Heinemann Educational Books LTD, London, 1970.

CN201980030279.9 Notification of the First Office Action dated Mar. 29, 2022.

EP-19825448.4 Extended European Search Report of European Patent Office dated Mar. 10, 2022.

JP2019-561773 Non-Final Notice of Reasons for Rejection dated Mar. 22, 2022.

CN201680061632.6 Notification of the First Office Action dated Sep. 14, 2021.

CN201880073578.6 Notification of the First Office Action dated Aug. 27, 2021.

EP-19743619.9 Extended European Search of European Patent Office dated Nov. 23, 2021.

EP-19743701.5 Extended European Search Report of European Patent Office dated Nov. 24, 2021.

EP19771688.9 Extended European Search Report of European Patent Office dated Dec. 2, 2021.

PCT/US2021/043435 International search report and written opinion of the international searching authority dated Nov. 1, 2021.

PCT/US2021/043444 International search report and written opinion of the international searching authority dated Nov. 1, 2021.

CN-201980020303.0—Notification of the First Office Action dated Dec. 16, 2021.

Cheng, et al., "Fast-Response Liquid Crystal Variable Optical Retarder and Multilevel Attenuator," Optical Engineering 52 (10), 107105 (Oct. 16, 2013). (Year: 2013).

PCT/US2021/029937 International search report and written opinion of the international searching authority dated Aug. 6, 2021.

PCT/US2021/029944 International search report and written opinion of the international searching authority dated Aug. 3, 2021.

PCT/US2021/029947 International search report and written opinion of the international searching authority dated Aug. 10, 2021.

PCT/US2021/029954 International search report and written opinion of the international searching authority dated Aug. 10, 2021.

PCT/US2021/029958 International search report and written opinion of the international searching authority dated Aug. 10, 2021.

CN-201880042320.X Notification of the Third Office Action from the Chinese Patent Office dated Dec. 30, 2022.

(56) References Cited

OTHER PUBLICATIONS

CN-201980082757.0 Notification of the 1st Office Action of the Chinese Patent Office dated Dec. 5, 2022.
JP2020-540724 Non-Final Notice of Reasons for Rejection dated Jan. 4, 2023.
JP-2020-540797 Non-Final Notice of Reasons for Rejection from the Japan Patent Office dated Dec. 6, 2022.
PCT/US2022/045030 International search report and written opinion of the international searching authority dated Jan. 3, 2023.
EP-20754927.0 Extended European Search Report of European Patent Office dated Sep. 19, 2022.
EP-20835231.0 Extended European Search Report of European Patent Office dated May 15, 2023.
PCT/US2023/012240 International search report and written opinion of the international searching authority dated Apr. 27, 2023.
PCT/US2023/012243 International search report and written opinion of the international searching authority dated May 10, 2023.
EP19771688.9 Notification of the First Office Action dated Mar. 6, 2023.
JP2020-550747 Non-Final Notice of Reasons for Rejection dated Mar. 29, 2023.
KR10-2020-7010753 Notice of Preliminary Rejection dated Feb. 17, 2023.
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
EP-20851155.0 Extended European Search Report of European Patent Office dated Aug. 2, 2023.
PCT/US2023/017639 International search report and written opinion of the international searching authority dated Jul. 6, 2023.

\* cited by examiner

STABILIZATION FOR PRIVACY DISPLAY

TECHNICAL FIELD

This disclosure generally relates to touch input for display devices with control of angular illumination for use in privacy display and low stray light displays.

BACKGROUND

Privacy displays provide image visibility to a primary user (that is typically in an on-axis position) and reduced visibility of image content to a snooper, that is typically in an off-axis position. A privacy function may be provided by micro-louvre optical films that transmit a higher luminance from a display in an on-axis direction with lower luminance in off-axis positions, however such films are not electrically switchable, and thus the display is limited to privacy only function.

Switchable privacy displays may be provided by control of the off-axis optical output.

Control of off-axis privacy may be provided by means of contrast reduction, for example by adjusting the liquid crystal out of plane tilt in an In-Plane-Switching LCD.

Control may be further provided by means of off-axis luminance reduction. Luminance reduction may be achieved by means of switchable backlights for a liquid crystal display (LCD) spatial light modulator. Off-axis luminance reduction may also be provided by switchable liquid crystal retarders, polarizers and compensation retarders arranged to modulate the input and/or output directional luminance profile of a spatial light modulator.

Touch screens are arranged to receive input locations from observer fingers or a stylus and may comprise capacitive touch, resistive touch, electro-magnetic resonance and other known touch sensing technologies.

BRIEF SUMMARY

According to a first aspect of the present disclosure there is provided a display device comprising: a spatial light modulator; a display polarizer arranged on a side of the spatial light modulator, the display polarizer being a linear polarizer; an additional polarizer arranged on the same side of the spatial light modulator as the display polarizer, the additional polarizer being a linear polarizer; and at least one polar control retarder arranged between the additional polarizer and the display polarizer, wherein the at least one polar control retarder comprises a switchable liquid crystal retarder comprising: first and second support substrates; a liquid crystal layer disposed between the first and second transparent support substrates, the liquid crystal layer comprising non-curable liquid crystal material and cured polymer material; electrodes arranged to apply a voltage for controlling the liquid crystal layer; and respective liquid crystal alignment layers supported on the first and second substrates adjacent the liquid crystal layer for aligning the non-curable liquid crystal material. The cured polymer material may comprise an acrylate or a thiol material. Cross-linked networks may be conveniently provided within the liquid crystal layer. Advantageously luminance and reflectivity artefacts during applied mechanical force due to liquid crystal cell thickness variations and liquid crystal flow variations may be reduced.

The cured polymer material may comprise a cured liquid crystal material. The cured liquid crystal material may comprise a reactive mesogen. The cured liquid crystal material may have an alignment that is aligned with the alignment of the non-curable liquid crystal material in a state in which a predetermined voltage is applied to the electrodes. Advantageously light scatter in one mode of operation may be reduced. Relaxation time for artefacts may be reduced. Thin flexible devices may be provided with low visibility of artefacts during folding.

The predetermined voltage may be capable of causing the layer of cured liquid crystal material and non-curable liquid crystal material simultaneously to introduce no net relative phase shift to orthogonal polarisation components of light passed by the display polarizer along an axis along a normal to the plane of the at least one polar control retarder and to introduce a net relative phase shift to orthogonal polarisation components of light passed by the additional polarizer along an axis inclined to a normal to the plane of the at least one polar control retarder. Advantageously the scatter may be reduced in a privacy mode of operation achieving increased visual security level. The scatter may be increased in a public mode of operation, achieving increased uniformity.

The cured liquid crystal material may be arranged in a network that extends between the two support substrates. The cured liquid crystal material may be a reactive mesogen. The ratio of the volume of the cured liquid crystal material to the volume of the non-curable liquid crystal material may be less than 5%. The network may be attached to each of the two support substrates. The electrodes may be disposed on opposite sides of the liquid crystal layer. A cured network may be provided that provides mechanical connection between the substrates across the area of the device. The optical properties of the switchable liquid crystal layer may be determined substantially by the properties of the non-curable liquid crystal material. Advantageously a stable liquid crystal layer that provides high resistance to image artefacts arising from applied mechanical force.

The display device may further comprise a control system arranged to control the voltage applied to the electrodes of the switchable liquid crystal retarder. Advantageously the display may be switched between a privacy mode and a public mode of operation.

The at least one polar control retarder may further comprise at least one passive compensation retarder. Advantageously the polar region in which high visual security level for an off axis snooper is extended.

The switchable liquid crystal retarder may comprise two surface alignment layers disposed adjacent to the liquid crystal material on opposite sides thereof and each may be arranged to provide homeotropic alignment at the adjacent liquid crystal material. The layer of liquid crystal material of the switchable liquid crystal retarder may comprise a liquid crystal material with a negative dielectric anisotropy. The layer of liquid crystal material may have a retardance for light of a wavelength of 550 nm in a range from 500 nm to 1000 nm, preferably in a range from 600 nm to 900 nm and most preferably in a range from 700 nm to 850 nm. The at least one passive retarder may comprise at least one passive retarder having an optical axis perpendicular to the plane of the retarder, the at least one passive retarder having a total retardance for light of a wavelength of 550 nm in a range from −300 nm to −900 nm, preferably in a range from −450 nm to −800 nm and most preferably in a range from −500 nm to −725 nm; or the at least one passive retarder comprises a pair of passive retarders which have optical axes in the plane of the retarders that are crossed, each passive retarder of the pair of passive retarders having a retardance for light of a wavelength of 550 nm in a range from 300 nm to 800 nm, preferably in a range from 500 nm to 700 nm and most preferably in a range from 550 nm to 675 nm. Advantageously a public mode may be provided with high image visibility over a wide polar region. Power consumption for operation in public mode may be reduced.

The switchable liquid crystal retarder may comprise two surface alignment layers disposed adjacent to the layer of liquid crystal material and on opposite sides thereof and each arranged to provide homogeneous alignment in the adjacent liquid crystal material. The layer of liquid crystal material of the switchable liquid crystal retarder comprises a liquid crystal material with a positive dielectric anisotropy. The layer of liquid crystal material may have a retardance for light of a wavelength of 550 nm in a range from 500 nm to 900 nm, preferably in a range from 600 nm to 850 nm and most preferably in a range from 700 nm to 800 nm. The at least one passive retarder may comprise at least one passive retarder having an optical axis perpendicular to the plane of the retarder, the at least one passive retarder having a total retardance for light of a wavelength of 550 nm in a range from −300 nm to −700 nm, preferably in a range from −350 nm to −600 nm and most preferably in a range from −700 nm to −500 nm; or the at least one passive retarder comprises a pair of passive retarders which have optical axes in the plane of the retarders that are crossed, each passive retarder of the pair of passive retarders having a retardance for light of a wavelength of 550 nm in a range from 300 nm to 800 nm, preferably in a range from 350 nm to 650 nm and most preferably in a range from 450 nm to 550 nm. Advantageously increased stability to applied mechanical force in comparison to homeotropic alignment may be achieved. In privacy mode a large polar region with high visual security level may be achieved. Thin flexible switchable retarders may be provided with high resilience to applied mechanical force.

According to a second aspect of the present disclosure there is provided a method of manufacturing a switchable liquid crystal retarder which is a polar control retarder for a display device, the method comprising: providing first and second support substrates having electrodes for controlling a liquid crystal layer and having first and second liquid crystal alignment layers supported thereon for aligning liquid crystal material of the liquid crystal layer; disposing a liquid crystal layer disposed between the first and second transparent support substrates with the first and second liquid crystal alignment layers adjacent the liquid crystal layer, the liquid crystal layer comprising non-curable liquid crystal material and curable liquid crystal material; curing the curable liquid crystal material while applying a predetermined voltage to the electrodes. Advantageously in operation low image scatter may be achieved in at least one mode of operation while achieving high resilience to applied mechanical force.

The predetermined voltage may be capable of causing the layer of cured liquid crystal material and the non-curable liquid crystal material simultaneously to introduce no net relative phase shift to orthogonal polarisation components of light passed by the additional polarizer along an axis along a normal to the plane of the at least one polar control retarder and to introduce a net relative phase shift to orthogonal polarisation components of light passed by the additional polarizer along an axis inclined to a normal to the plane of the at least one polar control retarder. The predetermined voltage may be non-zero. Advantageously the mode with low image scatter may be the privacy mode, such that the visual security level to an off-axis snooper is increased. Public mode image uniformity may be increased.

The curable liquid crystal material may be a reactive mesogen. Advantageously the reactive mesogen may be aligned by the applied voltage and alignment layers of the liquid crystal retarder.

The liquid crystal layer may further comprise a polymerisation photo-initiator, and the step of curing the curable liquid crystal material is performed by applying light radiation, and preferably ultraviolet light radiation to the liquid crystal layer. Advantageously a uniform liquid crystal layer may be provided.

Embodiments of the present disclosure may be used in a variety of optical systems. The embodiment may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
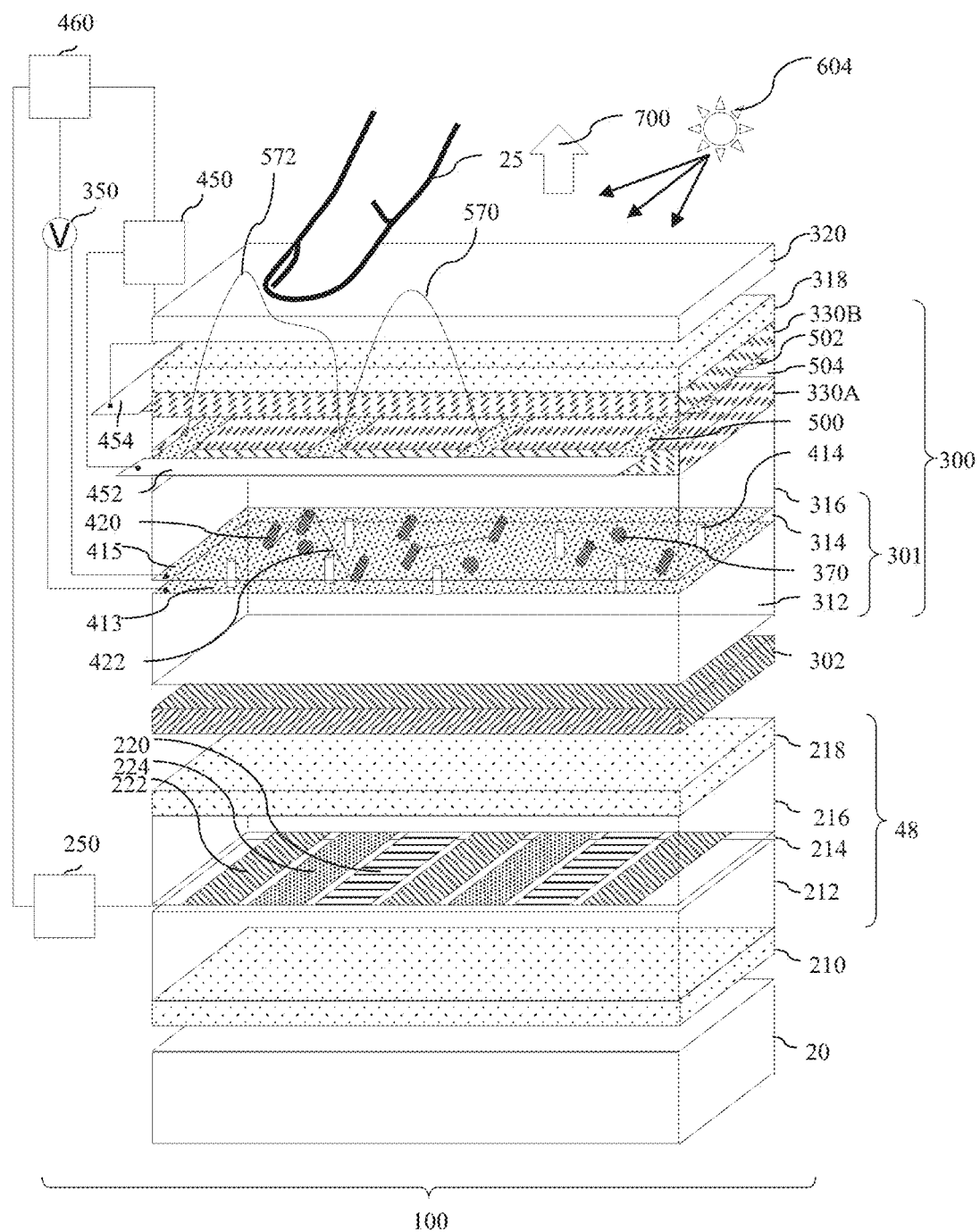
FIG. 1A is a schematic diagram illustrating in perspective side view a touch input display device comprising a spatial light modulator, reflective polarizer and switchable liquid crystal retarder comprising a stabilised liquid crystal layer.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a relative phase shift between two orthogonal polarization components of the light wave incident thereon and is characterized by the amount of relative phase, $\Gamma$, that it imparts on the two polarization components In some contexts, the term "phase shift" is used without the word "relative" but still meaning relative phase shift. The relative phase shift is related to the birefringence $\Delta n$ and the thickness d of the retarder by:

$$\Gamma = 2 \cdot \pi \cdot \Delta n \cdot d / \lambda_0 \qquad \text{eqn. 1}$$

In eqn. 1. $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarizers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP.

A linear SOP has a polarisation component with a non-zero amplitude and an orthogonal polarisation component which has zero amplitude.

A linear polarizer transmits a unique linear SOP that has a linear polarisation component parallel to the electric vector transmission direction of the linear polarizer and attenuates light with a different SOP.

Absorbing polarizers are polarizers that absorb one polarisation component of incident light and transmit a second orthogonal polarisation component. Examples of absorbing linear polarizers are dichroic polarizers.

Reflective polarizers are polarizers that reflect one polarisation component of incident light and transmit a second orthogonal polarisation component. Examples of reflective linear polarizers are multilayer polymeric film stacks such as DBEF™ or APF™ from 3M Corporation, or wire grid polarizers such as ProFlux™ from Moxtek.

A retarder arranged between a linear polarizer and a parallel linear analysing polarizer that introduces no relative net phase shift provides full transmission of the light other than residual absorption within the linear polarizer.

A retarder that provides a relative net phase shift between orthogonal polarisation components changes the SOP and provides attenuation at the analysing polarizer.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polarizer and the output display polarizer for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL=(Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y+K \sim P \cdot L \qquad \text{eqn. 6}$$

The visual security level may then be further given as:

$$VSL = \frac{(C + I \cdot \rho/\pi \cdot (C+1)/(P \cdot L))}{(C-1)} \qquad \text{eqn. 7}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL=1+I \cdot \rho/(\pi \cdot P \cdot L) \qquad \text{eqn. 8}$$

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 9}$$

and so:

$$M=((Y+R)-(K+R))/((Y+R)+(K+R))=(Y-K)/(Y+K+2 \cdot R) \qquad \text{eqn. 10}$$

Thus the visual security level (VSL), is equivalent (but not identical to) 1/M. In the present discussion, for a given off-axis relative luminance, P the wide angle image visibility, W is approximated as $$W=1/VSL=1/(1+I \cdot \rho/(\pi \cdot P \cdot L)) \qquad \text{eqn. 11}$$

Switchable directional display apparatuses for use in privacy display for example and comprising plural retarders arranged between a display polarizer and an additional polarizer are described in U.S. Pat. No. 10,126,575 and in U.S. Patent Publ. No. 2019-0086706, both of which are herein incorporated by reference in their entireties. Directional display apparatuses further comprising reflective polarizers arranged between the display polarizer and retarders are described in U.S. Pat. No. 10,303,030 U.S. and in U.S. patent application Ser. No. 16/256,120 filed Jan. 24, 2019, both of which are herein incorporated by reference in their entireties. Directional display polarizers comprising passive retarders arranged between a display polarizer and an additional polarizer are described in U.S. Patent Publ. No. 2018-0321553, which is herein incorporated by reference in its entirety. Also herein incorporated by reference in its entirety is U.S. patent application Ser. No. 16/256,754 filed Jan. 24, 2019.

The structure and operation of various switchable display devices will now be described. In this description, common elements have common reference numerals. It is noted that the disclosure relating to any element applies to each device in which the same or corresponding element is provided. Accordingly, for brevity such disclosure is not repeated.

It would be desirable to provide high image quality during touch input for a switchable directional display apparatus comprising a switchable liquid crystal retarder arranged between a display output polarizer and an additional polarizer for use in displays such as privacy displays.

Figure 1B:
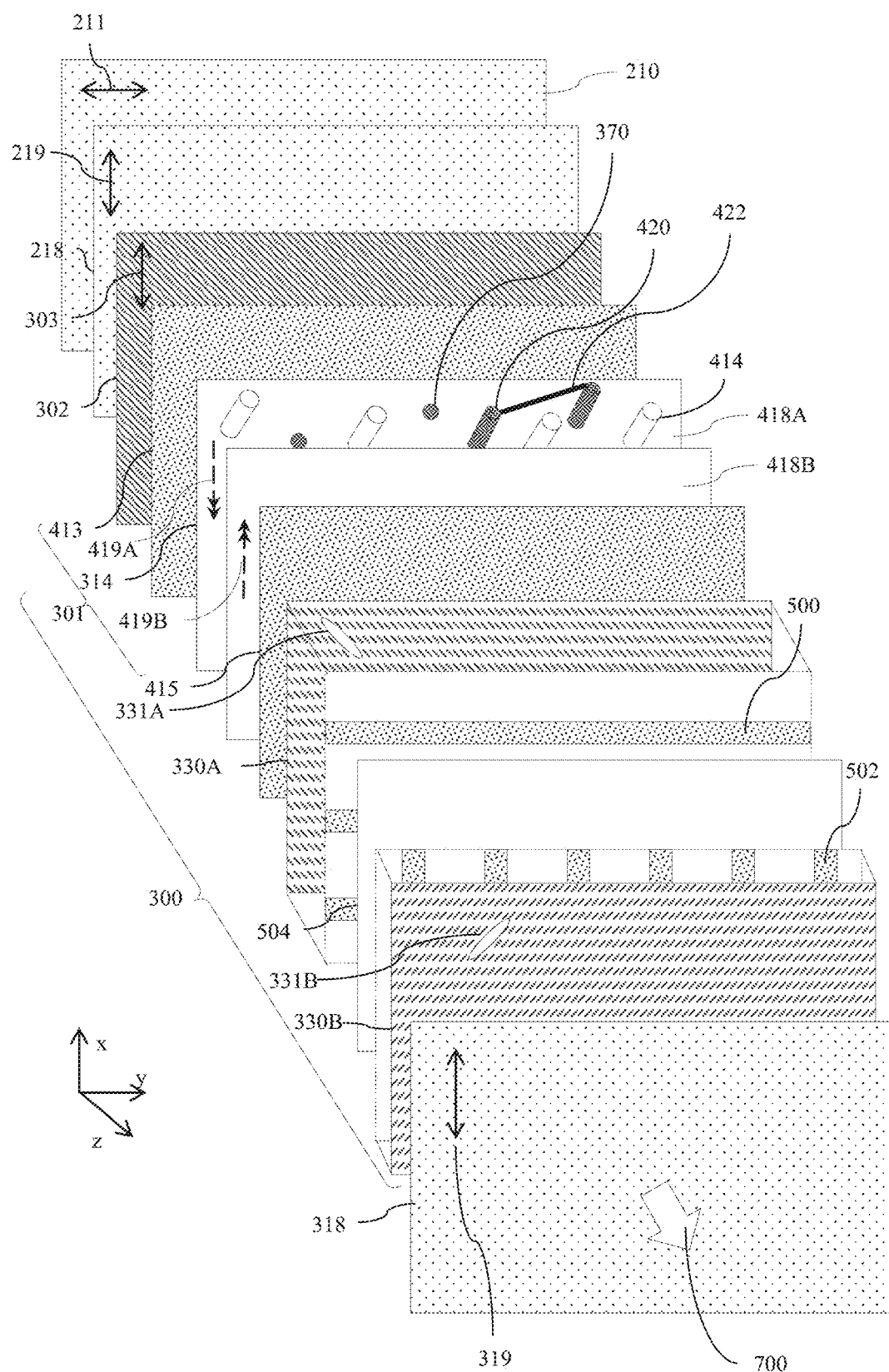
FIG. 1B is a schematic diagram illustrating in front view alignment of optical layers in the optical stack of FIG. 1.

FIG. 1A is a schematic diagram illustrating in perspective side view a touch input display device 100 comprising a spatial light modulator 48, reflective polarizer 302 and switchable liquid crystal retarder 300 wherein touch electrode arrays 500, 502 are provided on facing surfaces of first and second passive compensation retarders 330A, 330B; and FIG. 1B is a schematic diagram illustrating in front view alignment of optical layers and electrode layers in the optical stack of FIG. 1A.

Finger 25 location is detected by means of detection of distortion of field lines 570, 572 provided by the touch electrode arrays 500, 502 and control system comprising touch drivers 452, 454, touch controller 450 and system controller 460. At least one dielectric layer 504 is arranged between the switchable liquid crystal layer 314 and the additional polarizer 318. The first and second touch electrode arrays 500, 502 are arranged on opposite sides of the dielectric layer 504.

In FIG. 1A spatial light modulator 48 is a transmissive type spatial light modulator such as a liquid crystal display and further comprises backlight 20. In other embodiments (not illustrated) emissive displays such as OLED or micro-LED displays may be provided wherein the display 100 does not comprise input polarizer 210 and backlight 20.

The spatial light modulator 48 is arranged to output light 700 and comprises a display polarizer 218 arranged on the output side of the spatial light modulator 48; an additional polarizer 318 arranged on the output side of the display polarizer 218; a reflective polarizer 302 arranged between the display polarizer 218 and the additional polarizer 318; and at least one retarder 300 arranged between the reflective polarizer 302 and the additional polarizer 318. The display polarizer 218 and additional polarizer 318 are linear polarizers.

The display 100 is typically operated in environments with external illumination 604. Reflection of such illumination is used to provide increased visual security level to snoopers when the display operates in a privacy mode as will be described further below.

Plural retarders 300 comprises a switchable liquid crystal retarder 301 comprising a layer 314 of non-curable liquid crystal material 414 and cured liquid crystal material 420. The layer 314 is arranged between transparent support substrates 312, 316 and between the display polarizer 218 and the additional polarizer 318.

Electrodes 413, 415 and alignment layers 418A, 418B are arranged on the facing surfaces of support substrates 312, 316 respectively to provide electrical control and alignment respectively to the layer 314 of non-curable liquid crystal material 414.

The control system comprises a system controller 460 that is arranged to (i) provide image data to the spatial light modulator 48 by means of spatial light modulator controller 250 (ii) provide control of the voltage driver 350 to control the drive voltage V applied to the switchable liquid crystal retarder and (iii) and to control the signal applied to and measured from the touch electrode arrays 500, 502 by means of touch controller 450 and touch drivers 452, 454.

Reflective polarizer 302 is arranged between the display polarizer 218 and the plural retarders 300. The electric vector transmission direction 303 of the reflective polarizer 302 is parallel to the electric vector transmission direction 219 of the display polarizer 218 and electric vector transmission direction 319 of the additional polarizer 318.

Plural retarders 300 are arranged between the display polarizer 218 and the additional polarizer 318. Plural retarders 300 comprise: the switchable liquid crystal retarder 301 liquid crystal layer 314 arranged between input and output transparent support substrates 312, 316; and two passive compensation retarders 330A, 330B arranged between the switchable liquid crystal retarder 301 and the additional polarizer 318. The at least one passive compensation retarder 330 comprises a pair of passive uniaxial retarders 330A, 330B having optical axes in the plane of the retarders that are crossed.

More generally the display polarizer 218 is arranged on a side of the spatial light modulator 48, the display polarizer 218 being a linear polarizer. An additional polarizer 318 is arranged on the same side of the spatial light modulator 48 as the display polarizer 218, the additional polarizer 318 being a linear polarizer. In the case that the spatial light modulator is a transmissive spatial light modulator 48, the additional polarizer 318 may alternatively or additionally be arranged between backlight 20 and input polarizer 210 of the spatial light modulator. In the case that the spatial light modulator 48 is an emissive spatial light modulator, the plural retarders 300 and additional polarizer 318 are arranged on the output side of the output polarizer 218.

At least one polar control retarder 300 is arranged between the additional polarizer 318 and the display polarizer 218, wherein the at least one polar control retarder 300 comprises a switchable liquid crystal retarder 301 comprising: first and second support substrates 312, 316; a liquid crystal layer 314 disposed between the first and second transparent support substrates 312, 316, the liquid crystal layer 314 comprising non-curable liquid crystal material 414 and cured liquid crystal material 420. The cured liquid crystal material may be a reactive mesogen as will be further described below.

Electrodes 413, 415 are arranged to apply a voltage for controlling the liquid crystal layer 314; and respective liquid crystal alignment layers 418A, 418B supported on the first and second the support substrates 312, 316 adjacent the liquid crystal layer 314 for aligning the non-curable liquid crystal material 414.

Dielectric layer 504 is arranged between the passive retarders 330A, 330B. The first and second touch electrode arrays 500, 502 may be provided on at least one surface of at least one passive compensation retarder 330. The touch electrode arrays may be arranged on the facing surfaces of the pair of passive uniaxial retarders 330A, 330B. The dielectric layer 504 may comprise an adhesive layer provided between the touch electrode arrays 500, 502 arranged on the facing surfaces of the pair of passive uniaxial retarders 330A, 330B. The dielectric layer 504 may comprise for example an optically clear adhesive (OCA) or pressure sensitive adhesive (PSA), or may be provided by another dielectric material.

Touching finger 25 may be near or in contact with substrate 320 that may be a glass cover or hard coated polymer layer with an oleophobic hard coating to achieve mechanical robustness and resistance to finger grease. Touch control may also be provided by a pen or stylus.

As will be described further herein the layer 314 comprises cured liquid crystal material 420 that is provided as a network 424 comprising cross linked bonds 422 between the molecules of the material 420.

Spacers 370 that comprise sticky spacer balls and/or polymer walls may be provided. Advantageously some resistance to applied mechanical force may be provided. Visibility of flow of non-curable liquid crystal material 414 may be reduced.

FIG. 1B further illustrates an arrangement of orientations of various components. Polarisers 218, 302, 318 are aligned with electric vector transmission directions 219, 303, 319 respectively that are parallel. Passive retarders 330A, 330B are provided with optical axis directions 331A, 331B that are at 135 degrees and 45 degrees respectively. The shape and orientation of electrodes 500, 502 are illustrated as orthogonal stripes, however other shapes and orientations may be provided.

The structure and operation of an arrangement of plural retarders will now be described.

Figure 2A:
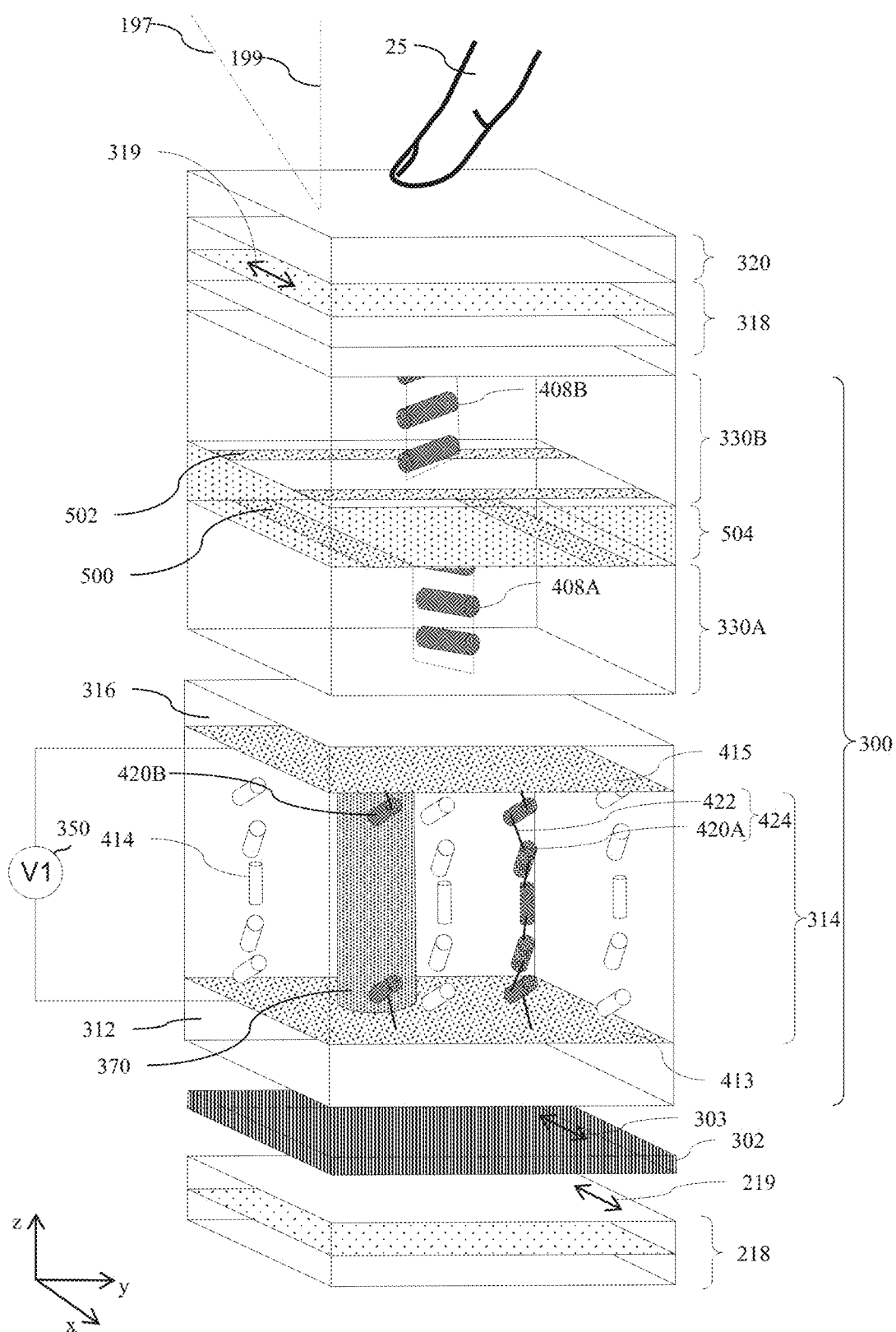
FIG. 2A and FIG. 2B are schematic diagrams illustrating in a different perspective side view the touch input display device of FIGS. 1A-B in privacy and wide angle modes of operation respectively.
Figure 2B:
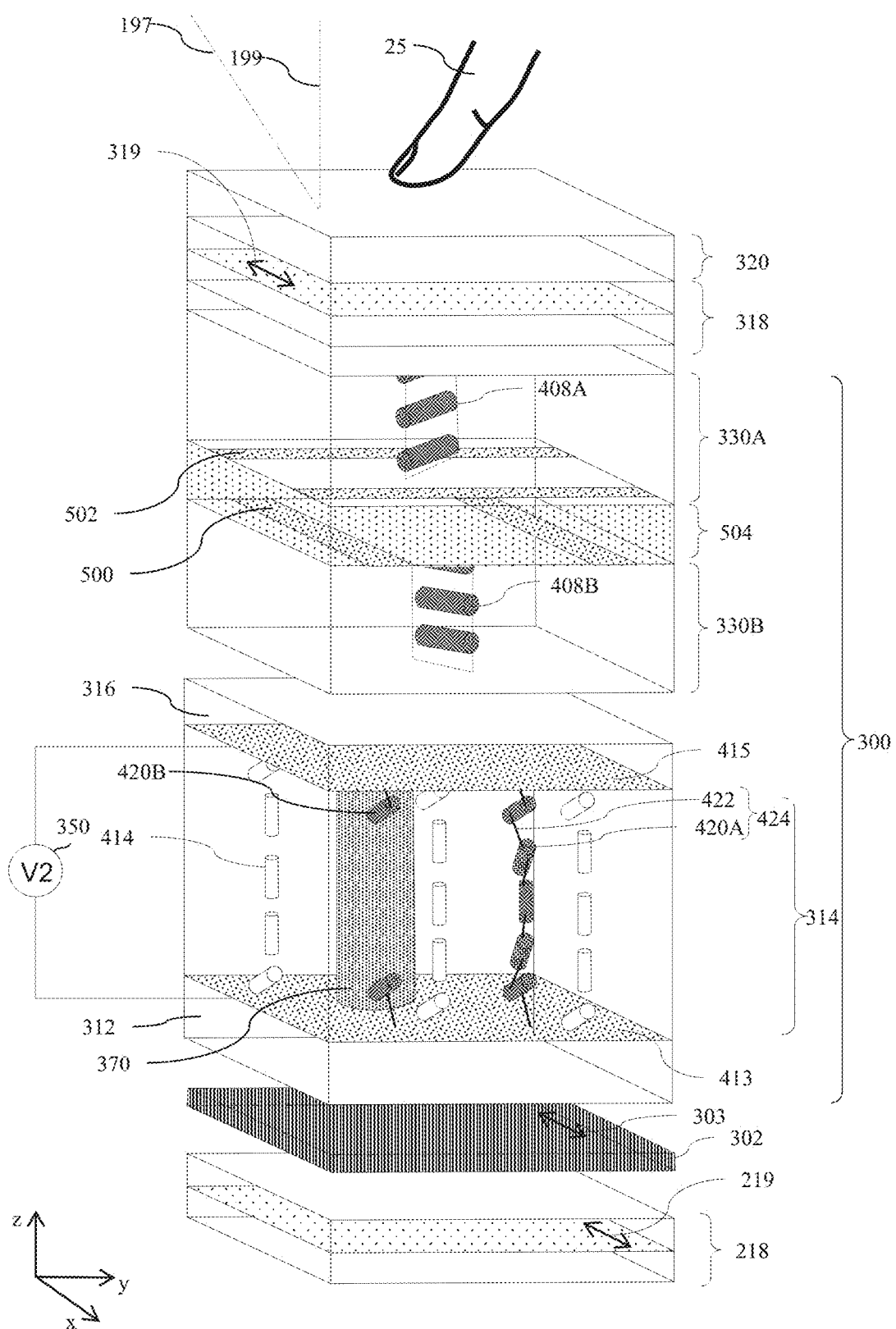

FIG. 2A is a schematic diagram illustrating in perspective side view an arrangement of a switchable retarder 300 in a privacy mode of operation wherein the switchable retarder 301 comprises a switchable liquid crystal layer 314 with homogeneous alignment and crossed A-plate polar control passive retarders 330A, 330B; and FIG. 2B is a schematic graph illustrating the variation of output luminance with polar direction for transmitted light rays in FIG. 2A in a public mode of operation.

The passive retarders 330A, 330B are composed of non-switching molecules 408A, 408B respectively.

The switchable liquid crystal retarder 301 comprises two surface alignment layers 418A, 418B disposed adjacent to the layer 314 of non-curable liquid crystal material 414 and on opposite sides thereof and each arranged to provide homogeneous alignment in the adjacent non-curable liquid crystal material 414. Advantageously in comparison to homeotropic alignment, the homogeneous alignment provides a high restoring force for the molecules of the non-curable liquid crystal material 414.

The switchable liquid crystal retarder 301 and passive retarders 330 may be replaced by any of those described in U.S. Pat. No. 10,126,575, in U.S. Patent Publ. No. 2019-0086706, in U.S. Pat. No. 10,303,030, in U.S. patent application Ser. No. 16/256,120 filed Jan. 24, 2019, in U.S. Provisional Patent Appl. No. 62/756,902 filed Nov. 7, 2018, and in U.S. Provisional Patent Appl. No. 62/844,980 filed May 8, 2019, all of which are herein incorporated by reference in their entireties.

The switchable liquid crystal layer 314 is driven by a first voltage V1 in the privacy mode. Molecules of non-curable liquid crystal material 414 and cured liquid crystal material 420 are aligned with the same alignment, that is the variation of tilt of the molecules through the thickness of the layer 314 is the same for the cured material 422 and non-curable material 420.

The switchable liquid crystal layer 314 is driven by a second voltage V2 in the public mode. Molecules of non-curable liquid crystal material 414 and cured liquid crystal material 420 are aligned with different alignments, that is the variation of tilt through the layer 314 is different for the material 420 and the material 422. The alignment of liquid crystals in the layer 314 will be described with reference to FIG. 4.

Some of the cured liquid crystal material 420A may be arranged in a network 424 that extends between the two support substrates 312, 316 and the network 424 is attached to each of the two support substrates 312, 316. Some of the cured liquid crystal material 420B may be arranged to be attached to the support substrates 312, 316.

In privacy mode, the switchable liquid crystal layer 314 the predetermined voltage V1 causes the layer 314 of cured liquid crystal material 420 and the non-curable liquid crystal material 414 simultaneously to introduce no net relative phase shift to orthogonal polarisation components of light passed by the additional polarizer 318 along an axis 199 along a normal to the plane of the at least one polar control retarder 300 and to introduce a net relative phase shift to orthogonal polarisation components of light passed by the additional polarizer along an axis 197 inclined to a normal to the plane of the at least one polar control retarder 300. Such variation of phase shift when combined with passive retarders 330 and analysed by polarizers 218, 302 and 318 provides polar variations of transmission and reflectivity such as those illustrated in FIGS. 3A-B.

In public mode, the switchable liquid crystal layer 314 is driven by V2 that is different to the predetermined voltage V1. The voltage V2 causes the layer 314 of non-curable liquid crystal material 414 simultaneously to introduce no net relative phase shift to orthogonal polarisation components of light passed by the additional polarizer 318 along an axis 199 along a normal to the plane of the at least one polar control retarder 300 and to introduce a substantially reduced net relative phase shift to orthogonal polarisation components of light passed by the additional polarizer along an axis 197 inclined to a normal to the plane of the at least one polar control retarder 300. Such variation of phase shift when combined with passive retarders 330 and analysed by polarizers 218, 302 and 318 provides polar variations of transmission and reflectivity such as those illustrated in FIGS. 3C-D.

The network 424 of cured liquid crystal material 414 is attached to substrates 312, 316. Distortion of the thickness of the layer 314 during applied mechanical force is reduced. The retardance of the layer 314 is substantially maintained and the said net relative phase shift introduced by applied mechanical force is maintained for both privacy and public modes of operation. Advantageously luminance and reflectivity artefacts in the region of the applied mechanical force are reduced. In other words, during applied force the liquid crystal layer 314 thickness may vary creating undesirable retardance profiles in the layer 314. The network 424 of aligned cured liquid crystal molecules 420 provides resistance to changes in the cell gap, achieving a achieving a uniform retardance profile across the display area. Advantageously the visibility of artefacts due to changes of layer 314 thickness is reduced.

The molecules 420B that are arranged near to the substrates 312, 316 may be arranged to increase the restoring force of the molecules 414 after application of mechanical force. Advantageously visibility of artefacts may be reduced.

During applied mechanical force, non-curable liquid crystal material 414 may flow within the layer 314. Such flow may provide disclinations which adjust the retardance properties of the layer 314, and change the said net relative phase shift. Such undesirable disclinations will be illustrated in FIGS. 9A-B below in a layer not comprising cured liquid crystal material 420.

The cured liquid crystal material 420 provides an increased restoring force for non-curable liquid crystal material 414, prevents the formation of large area disclinations and may reduce the relaxation time of disclinations after flow. Advantageously the time for which luminance and reflectivity artefacts in the region of the applied mechanical force are visible may be reduced and the size of artefacts may be reduced.

In privacy mode, light scatter in the layer 314 undesirably directs image data to snooper locations, and reduces the visual security level. Molecules of non-curable liquid crystal material 414 and cured liquid crystal material 420 are aligned with a common alignment. Light scatter is reduced and advantageously privacy mode visual security level is increased.

In public mode, light scatter may be provided in the layer 314 due to the misalignment between the molecules of materials 414, 420. Advantageously such scatter provides increased angular luminance uniformity in public mode, increasing the image visibility for off-axis users.

During applied force flow of non-curable liquid crystal material 414 may occur in the liquid crystal layer 314. Flow may result in undesirable liquid crystal misalignment and disclinations that may provide visual artefacts. The network 424 of aligned cured liquid crystal molecules 420 provides resistance to flow of non-curable liquid crystal material 414. The amount of retardance change and disclinations in the layer 314 due to flow is reduced and advantageously the visibility of artefacts due to material flow is reduced.

In privacy mode, the drive voltage V1 may be lower than the drive voltage V2 for the public mode as illustrated in TABLE 1 below for the embodiments of FIGS. 3A-D. A high drive voltage increases the restoring force and reduces the relaxation time after flow, reducing the time of artefact visibility. It is desirable to provide increased restoring force in layer 314 with lower drive voltage.

In the present embodiments, the molecules of materials 414, 420 are aligned in the driven state for a given voltage V1 and the restoring force provided by the molecules of the cured liquid crystal material 420 provides the same energy minimum as provided by the drive voltage V1. The total restoring force on the molecules 414 is increased, reducing the size and decay time of disclinations. Advantageously the visibility of artefacts is reduced.

In the public mode has reduced time for artefact visibility due to the restoring force provided by the high drive voltage. Advantageously the time for visibility and size of flow artefacts are reduced in both privacy and public modes of operation.

In public mode, the voltage V2 provides a phase structure with a slow polar variation of luminance and reflectivity with polar angle as will be described in FIGS. 3C-D whereas the polar roll-off is faster in privacy mode as will be described in FIGS. 3A-B. Retardance variations in layer 314 from material flow in regions of applied force are visible as local luminance and reflectivity variations that depend on polar angle and distort the polar luminance and reflectivity profiles. The aligned cured liquid crystal material 420 provides an increased restoring force in the privacy mode of operation, reducing the range of polar angles from which the artefacts are present. Advantageously the polar variation of visibility of material 414 flow and disclination artefacts is reduced in privacy mode and public mode.

Features of the arrangements of FIGS. 2A-B not discussed in further detail may be assumed to correspond to the features with equivalent reference numerals as discussed above, including any potential variations in the features.

The optical output of an illustrative embodiment will now be described.

Figure 3A:
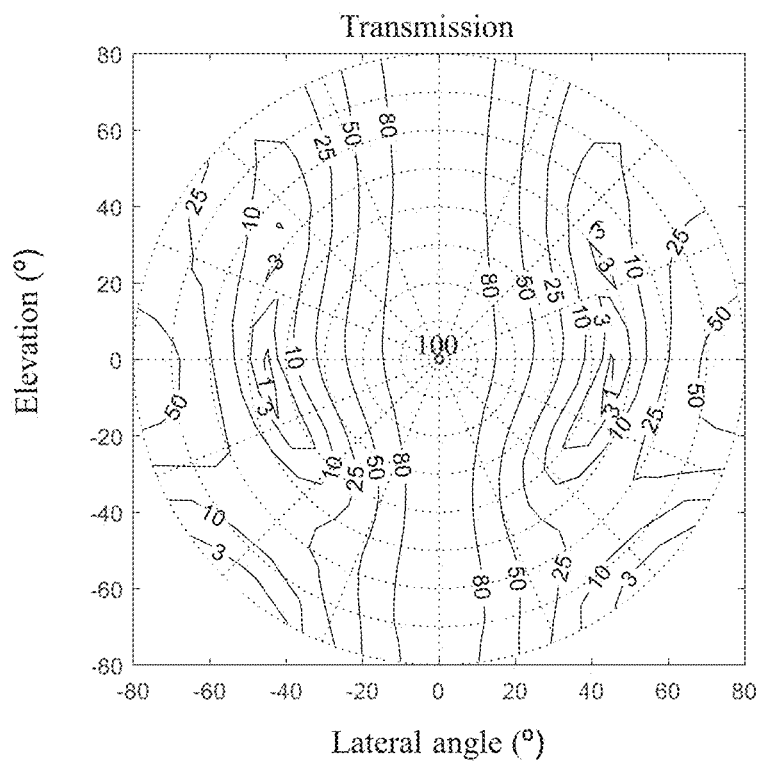
FIG. 3A is a schematic graph illustrating the variation of transmitted luminance with polar direction for transmitted light rays in FIG. 2A in a privacy mode of operation.
Figure 3B:
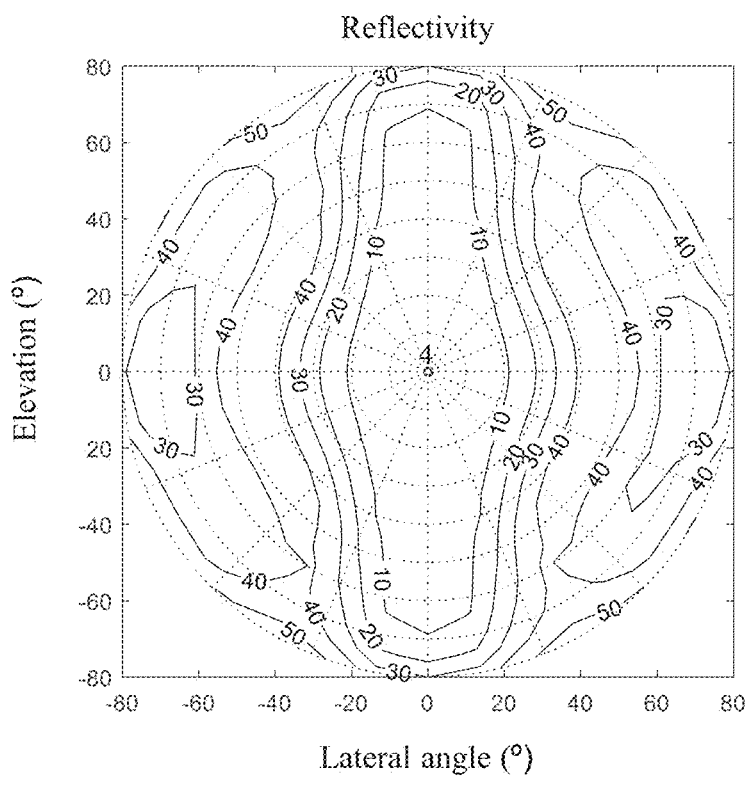
FIG. 3B is a schematic graph illustrating the variation of reflectivity with polar direction for reflected light rays in FIG. 2A in a privacy mode of operation.
Figure 3C:
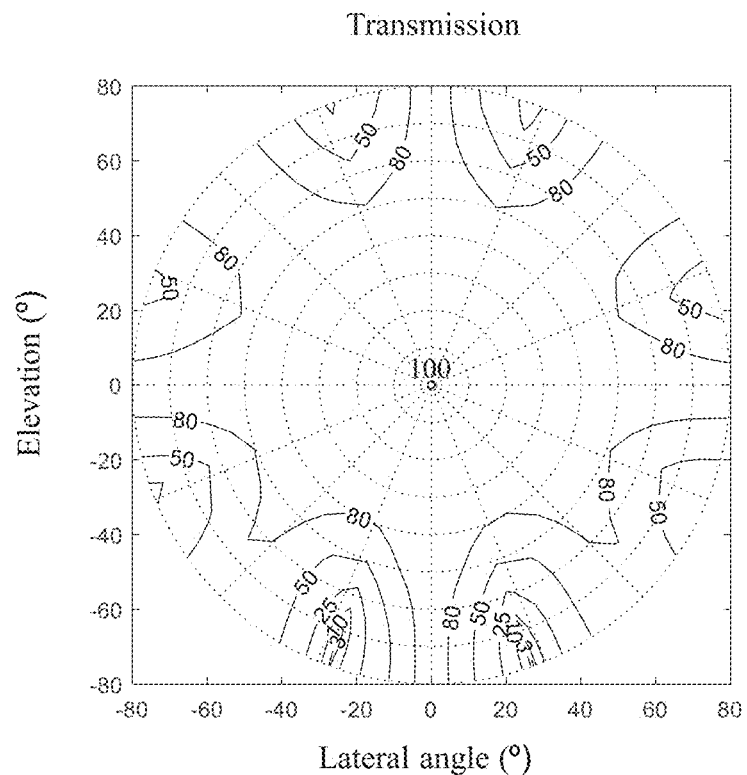
FIG. 3C is a schematic graph illustrating the variation of transmitted luminance with polar direction for transmitted light rays in FIG. 2B in a public mode of operation.
Figure 3D:
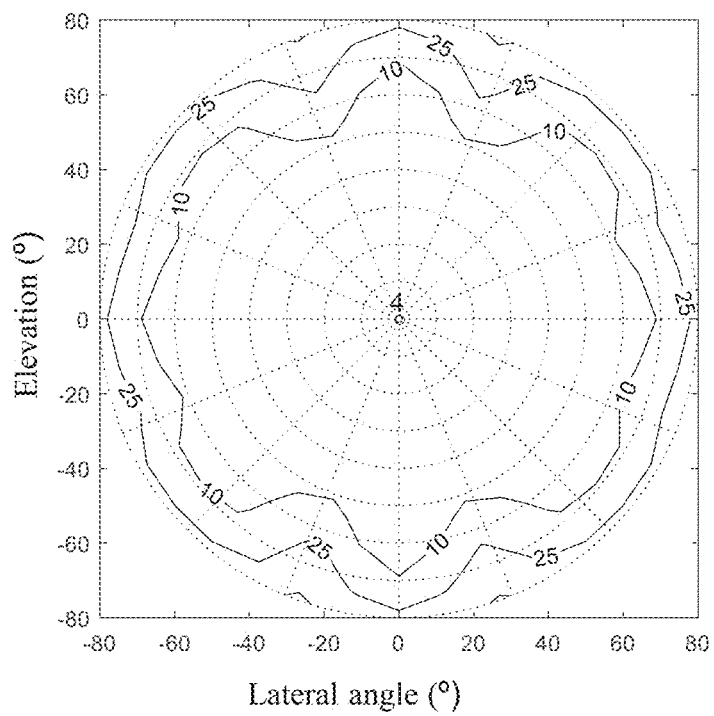
FIG. 3D is a schematic graph illustrating the variation of reflectivity with polar direction for reflected light rays in FIG. 2B in a public mode of operation.

FIG. 3A is a schematic graph illustrating the variation in transmission with polar direction for transmitted light rays in FIG. 2A in a privacy mode of operation; and FIG. 3B is a schematic graph illustrating the variation of reflectivity with polar direction for reflected light rays in FIG. 2A in a privacy mode of operation; FIG. 3C is a schematic graph illustrating the variation in transmission with polar direction for transmitted light rays in FIG. 2B in a public mode of operation; and FIG. 3D is a schematic graph illustrating the variation of reflectivity with polar direction for reflected light rays in FIG. 2B in a public mode of operation comprising the arrangement of TABLE 1.

TABLE 1

| | Passive polar control retarder(s) 330 | | Active LC retarder 314 | | | | |
|---|---|---|---|---|---|---|---|
| Mode | Type | Δn.d/ nm | Alignment layers 418 | Pretilt/ deg | Δn.d/ nm | Δε | Voltage/ V |
| Public | Crossed A | +500 @ 45° | Homogeneous | 2 | 750 | 13.2 | 10 (V2) |
| Privacy | | +500 @ 135° | Homogeneous | 2 | | | 2.3 (V1) |

The layer 314 of non-curable liquid crystal material 414 of the switchable liquid crystal retarder 301 comprises a non-curable liquid crystal material 414 with a positive dielectric anisotropy.

In the present embodiments, desirable ranges for retardations and voltages have been established by means of simulation of retarder stacks and experiment with display optical stacks. Ranges for retardances will now be described that provide design configurations for various optical layers.

The predetermined voltage is non-zero. The layer 314 of non-curable liquid crystal material 414, 420 has a retardance for light of a wavelength of 550 nm in a range from 500 nm to 900 nm, preferably in a range from 600 nm to 850 nm and most preferably in a range from 700 nm to 800 nm.

The at least one passive retarder 330 comprises a pair of passive retarders 330A, 330B which have optical axes in the plane of the retarders that are crossed, each passive retarder 330A, 330B of the pair of passive retarders having a retardance for light of a wavelength of 550 nm in a range from 300 nm to 800 nm, preferably in a range from 350 nm to 650 nm and most preferably in a range from 450 nm to 550 nm.

In another embodiment (not shown) the at least one passive retarder 330 may comprise at least one passive retarder 330 having an optical axis perpendicular to the plane of the retarder 330, the at least one passive retarder 330 having a total retardance for light of a wavelength of 550 nm in a range from −300 nm to −700 nm, preferably in a range from −350 nm to −600 nm and most preferably in a ranges from −400 nm to −500 nm. The passive retarders may be provided using stretched films to advantageously achieve low cost and high polar uniformity.

The passive polar control retarder 330 is provided by a pair of A-plates 330A, 330B that have crossed axes. In the present embodiments, 'crossed' refers to an angle of substantially 90° between the optical axes of the two retarders in the plane of the retarders. To reduce cost of retarder materials, it is desirable to provide materials with some variation of retarder orientation due to stretching errors during film manufacture for example. Variations in retarder orientation away from preferable directions can reduce the head-on luminance and increase the minimum transmission. Preferably the angle between the optical axes in the plane of the retarders is at least 35° and at most 55°, more preferably at least 40° and at most 50° and most preferably at least 42.5° and at most 47.5°.

FIGS. 3A-D illustrate that high luminance and low reflectivity are achieved in directions that are parallel to the axis 199. Advantageously a head-on user sees a high image visibility for both privacy and public modes of operation.

FIGS. 3A-B illustrate that low luminance and high reflectivity are achieved in directions that are along axis 197 that is inclined to the axis 199 in the lateral direction for privacy operation. Advantageously off-axis snoopers are presented with a high visual security level during privacy mode of operation. FIGS. 3C-D illustrate that high luminance and low reflectivity are achieved in directions that are along axis 197 that is inclined to the axis 199 in the lateral direction for public operation. Advantageously off-axis users are presented with a high image visibility during public mode of operation.

Figure 4:
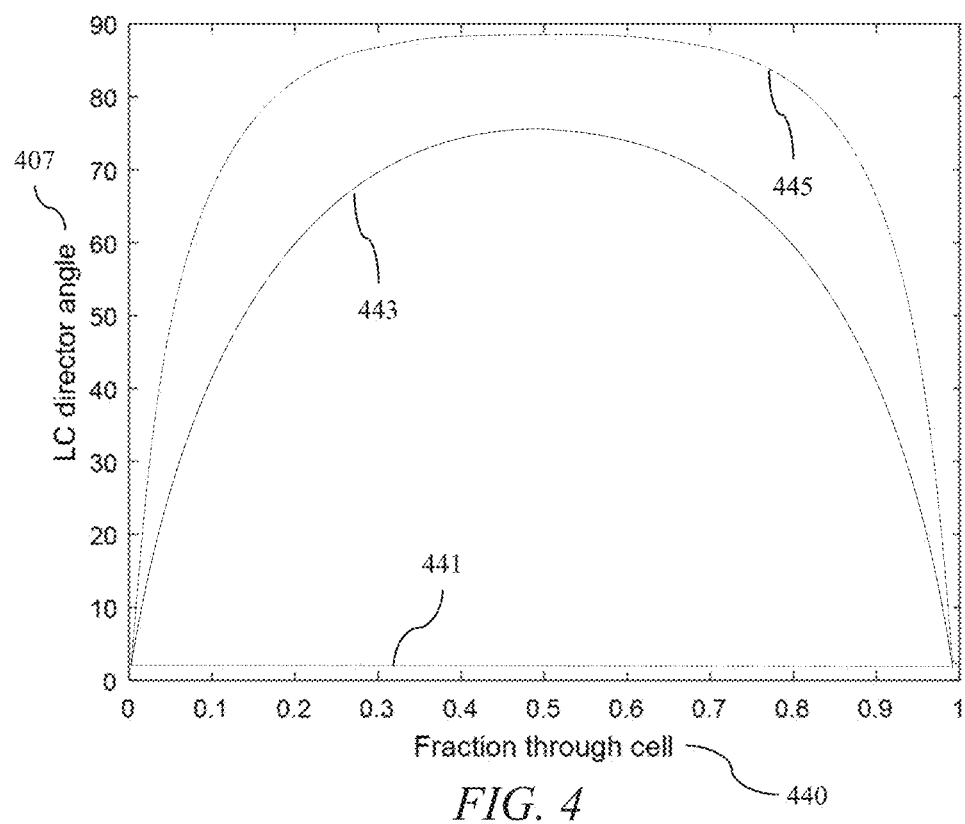
FIG. 4 is a schematic diagram illustrating a graph of liquid crystal director angle against fractional location through the switchable liquid crystal retarder cells of FIGS. 2A-B and FIGS. 3A-D for different applied voltages.

FIG. 4 is a schematic diagram illustrating a graph of liquid crystal director angle against fractional location through the switchable liquid crystal retarder cells of FIGS. 2A-B and FIGS. 3A-D for different applied voltages.

Profile 441 illustrates non-curable liquid crystal material 414 tilt angle for 0V applied voltage; tilt profile 443 illustrates director orientations for privacy mode such as an applied voltage V1 of 2.5V; and tilt profile 445 illustrates director orientations for public mode such as an applied voltage V2 of 5V. Thus the director profiles through the thickness of the cell for the privacy and wide angle modes. The cured liquid crystal material 420 of the present embodiments has a profile 443 for both privacy mode and public mode. By comparison, the non-curable liquid crystal material 414 switches between the profile 445 in public mode and 443 in private mode.

In operation, applied pressure may distort the profiles 443, 445. Distortion of profile 443 is more visible than profile 445. Advantageously the present embodiments achieve increased resistance of the non-curable liquid crystal material to deviate from the profile 443. Image artefacts are reduced during applied pressure.

A method to manufacture a stabilised liquid crystal retarder for a switchable privacy display that has low visibility of artefacts during applied mechanical force will now be given.

FIGS. 5A-D are schematic diagrams illustrating in a perspective side view a method to provide a reactive mesogen polymer stabilised switchable liquid crystal retarder for a privacy display. Features of the arrangement of FIGS. 5A-D not discussed in further detail may be assumed to correspond to the features with equivalent reference numerals as discussed above, including any potential variations in the features.

Figure 5A:
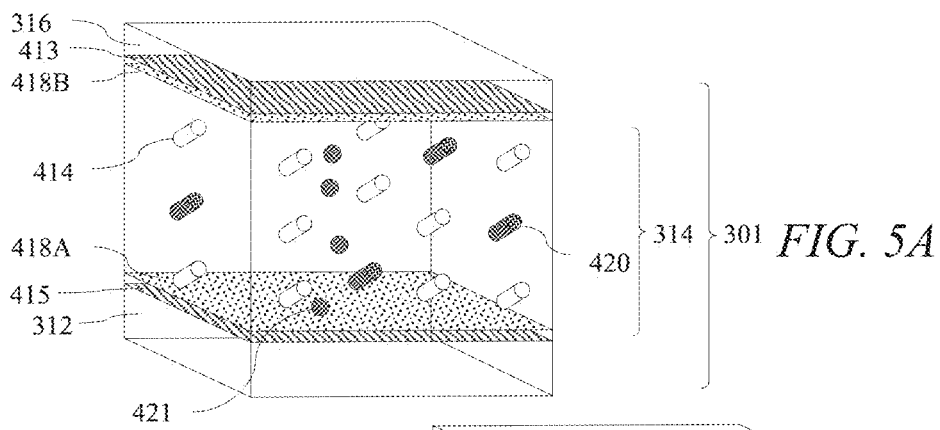
FIG. 5A, FIG. 5B, FIG. 5C, and FIG. 5D are schematic diagrams illustrating in a perspective side view a method to provide a liquid crystal polymer stabilised switchable liquid crystal retarder for a privacy display comprising homogeneous alignment layers.

A method of manufacturing a switchable liquid crystal retarder 301 which is a polar control retarder for a display device 100 comprises in a first step shown in FIG. 5A providing first and second support substrates 312, 316 having electrodes 413, 415 for controlling a liquid crystal layer 314 and having first and second liquid crystal alignment layers 418A, 418B supported thereon for aligning liquid crystal material of the liquid crystal layer 314 and disposing a liquid crystal layer 314 disposed between the first and second transparent support substrates 312, 316 with the first and second liquid crystal alignment layers 418A, 418B adjacent the liquid crystal layer 314, the liquid crystal layer 314 comprising non-curable liquid crystal material 414 and curable liquid crystal material 420. The liquid crystal layer may comprise the optical properties illustrated in TABLE 1, or other tables herein.

The curable liquid crystal material 420 may be a reactive mesogen. A reactive mesogen (RM) is a low molecular weight liquid crystalline material containing a reactive end group that is polymerizable by visible or UV light. RMs have the intrinsic features of liquid crystals including self-organisation, anisotropic optical and dielectric properties, and controlled alignment defined by a surface alignment layer for example rubbed polyimide; at the same time, they can be polymerized in to networks structures or solid materials with their liquid crystalline alignments and anisotropic properties retained. By way of example as opposed to limitation, example reactive mesogen material include RM257 and RM488 marketed by Merck Ltd. Example photo initiators include Irgacure 651 marketed by Ciba.

The ratio of the volume of the curable liquid crystal material 420 to the volume of the non-curable liquid crystal material 414 may be less than 5%. Advantageously scatter may be reduced and visual security level in privacy mode increased.

FIG. 5A further illustrates the liquid crystal layer 314 comprising curable polymer material 421 that may be isotropic. Prior to cure the curable polymer material may comprise monomer materials. Curable polymer materials 420, 421 may include materials comprising acrylates or thiols.

Figure 5B:
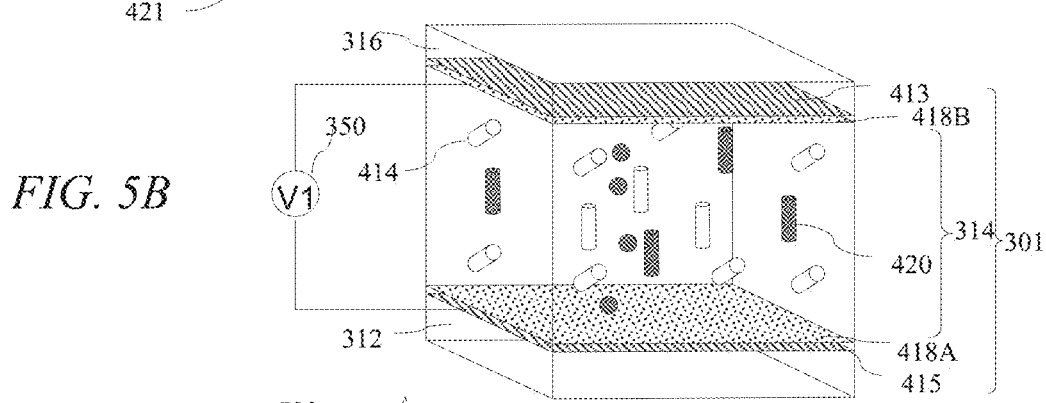
Figure 5C:
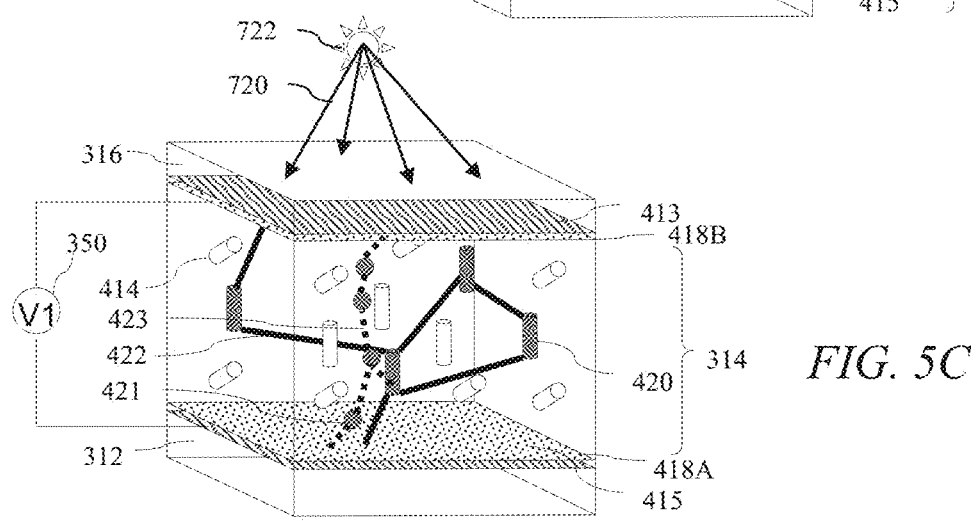

FIG. 5B illustrates that a predetermined voltage V1 is applied to the electrodes 418A, 418B. FIG. 5C illustrates curing the curable liquid crystal material 420 while applying the predetermined voltage V1. The liquid crystal material may further comprise a polymerisation photo-initiator. The step of curing the curable liquid crystal material is performed by applying light radiation 720 from light source 722, and preferably ultraviolet light radiation to the liquid crystal layer 314.

Figure 5D:
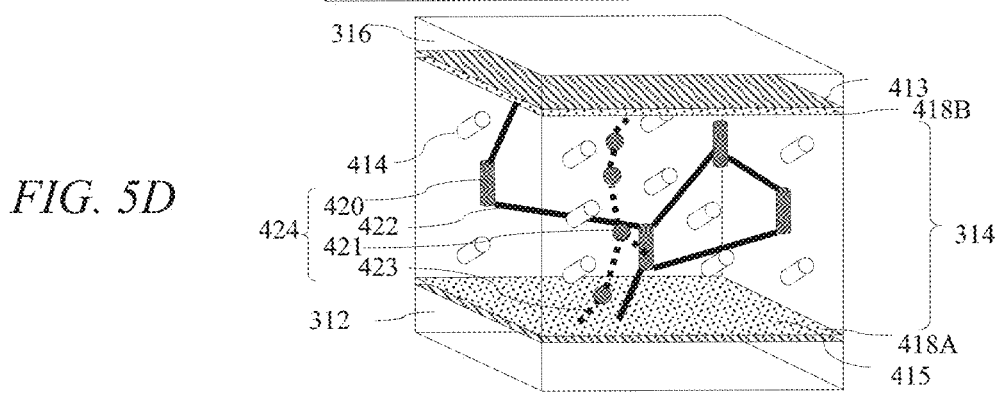

FIG. 5D illustrates the liquid crystal retarder 301 after the curable liquid crystal material 420 is cured to provided network 424 and the voltage V1 is removed. The non-curable liquid crystal molecules 414 are provided with a tilt and orientation provided by the pretilt and alignment direction of the alignment layers 418A, 418B. The cured liquid crystal material 420 is provided by the applied voltage V1 and alignment direction of the alignment layers 418A, 418B at the curing step of FIG. 5C.

Network 424 may comprise networks of cured liquid crystal materials 420 and cured isotropic materials 421. Cross linking may be provided between the cured polymer materials 420, 421 by means of bonding between the liquid crystal materials 420, between the isotropic materials 422 or between the liquid crystal materials 420 and isotropic materials 421. Advantageously increased resistance to applied mechanical force may be achieved.

In other words, a method to manufacture a liquid crystal retarder for a privacy display device 100 comprises the steps of: (i) providing first and second transparent support substrates 312, 316 with electrodes 413, 415 on at least one side of each of the first and second transparent support substrates 312, 316; (ii) forming a liquid crystal alignment layer 418A, 418B on an electrode 413, 415 of each of the first and second transparent support substrates 312, 316; (iii) providing a liquid crystal layer 314 between the alignment layers; wherein the liquid crystal layer 314 comprises (a) a non-curable liquid crystal material 414 and (b) a curable liquid crystal material 420; (iv) applying a curing step voltage across the electrodes; and (v) curing the curable liquid crystal material 420. The curing step voltage V1 is the voltage at which the liquid crystal retarder is driven to provide a privacy mode of operation of the display device (such as illustrated in FIG. 2A). The curable liquid crystal material 420 comprises a photo-initiator and the step of curing the curable liquid crystal material comprises illumination by ultraviolet radiation 720.

As illustrated in FIG. 5D, after cure the light source 722 and voltage driver are removed and the molecules of the non-curable liquid crystal material 414 relax while the molecules of the cured liquid crystal material 420 remain in the cured liquid crystal network 424 comprising the molecular orientation of the driven state.

Advantageously a switchable liquid crystal retarder 301 may be provided for use in a switchable privacy display 100 that has low visibility of artefacts due to applied pressure during touch operation.

It would be desirable to reduce the thickness of the polar control retarder 300 while achieving high image quality during touch operation.

Figure 6A:
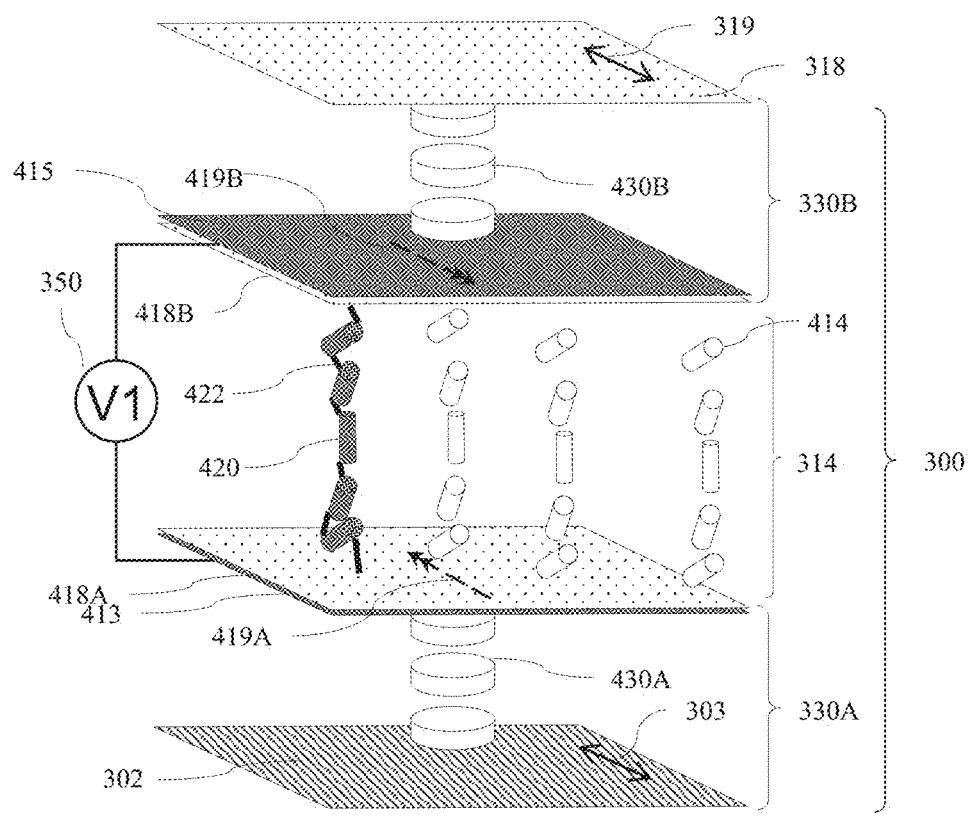
FIG. 6A is a schematic diagram illustrating in perspective side view an arrangement of a switchable compensated retarder comprising a homogeneously aligned switchable liquid crystal retarder and a negative C-plate in a privacy mode of operation.
Figure 6B:
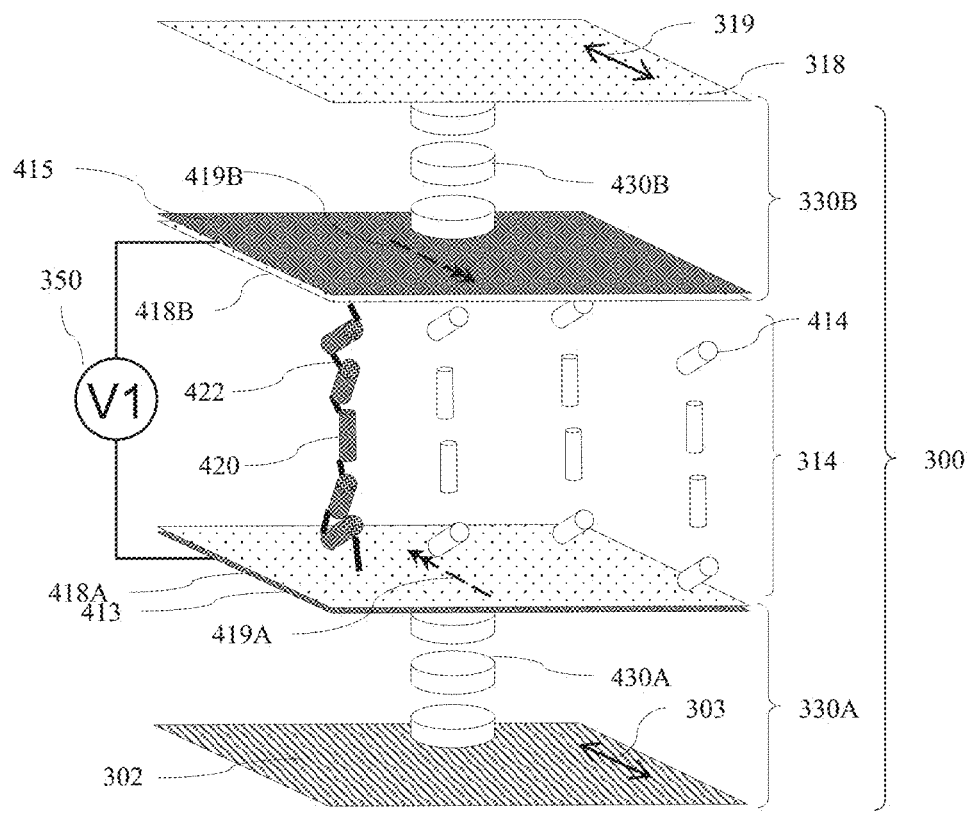
FIG. 6B is a schematic diagram illustrating in perspective side view an arrangement of a switchable compensated retarder comprising a homogeneously aligned switchable liquid crystal retarder and a negative C-plate for a different applied voltage to provide operation in a public mode of operation.
Figure 6C:
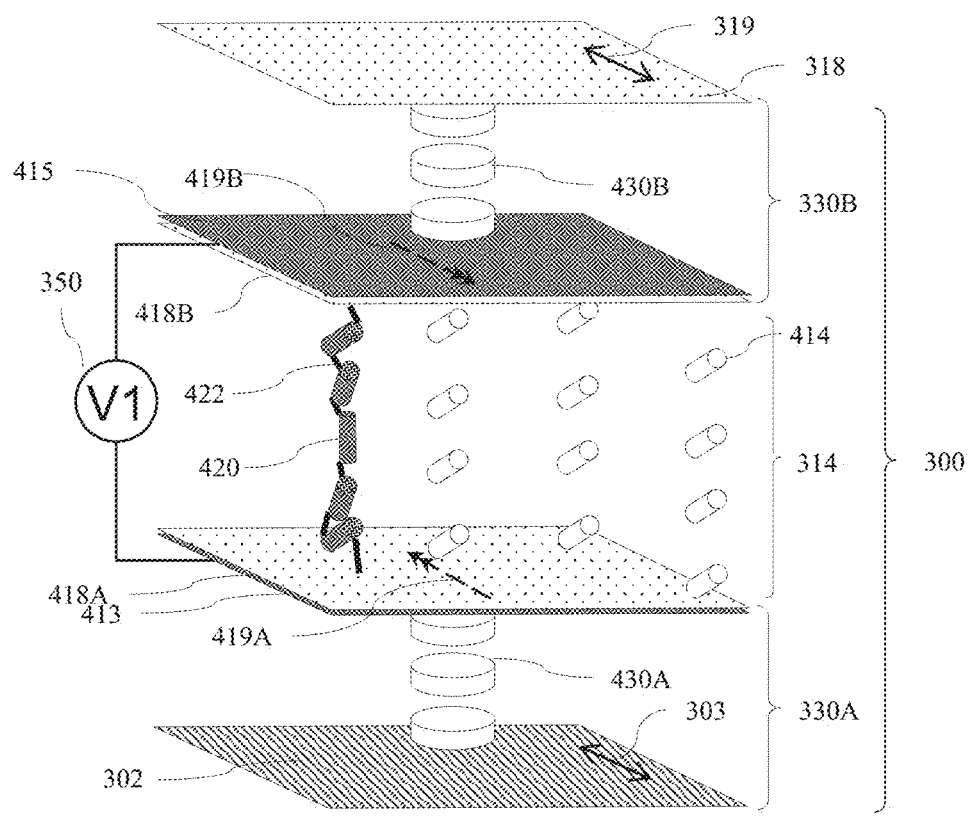
FIG. 6C is a schematic diagram illustrating in perspective side view an arrangement of a switchable compensated retarder comprising a homogeneously aligned switchable liquid crystal retarder and a negative C-plate for no applied voltage.

FIG. 6A is a schematic diagram illustrating in perspective side view an arrangement of a switchable compensated retarder comprising a homogeneously aligned switchable liquid crystal retarder and a negative C-plate in a privacy mode of operation; FIG. 6B is a schematic diagram illustrating in perspective side view an arrangement of a switchable compensated retarder comprising a homogeneously aligned switchable liquid crystal retarder and a negative C-plate for a different applied voltage to provide operation in a public mode of operation; and FIG. 6C is a schematic diagram illustrating in perspective side view an arrangement of a switchable compensated retarder comprising a homogeneously aligned switchable liquid crystal retarder and a negative C-plate for no applied voltage. Features of the arrangement of FIGS. 6A-C not discussed in further detail may be assumed to correspond to the features with equivalent reference numerals as discussed above, including any potential variations in the features.

In comparison to the arrangements of FIG. 1A and FIGS. 2A-B, the first and second support substrates 312, 316 may be provided by passive compensation retarders 330A, 330B.

The passive compensation retarder 330 comprises a negative C-plate retarder having an optical axis that is a fast axis perpendicular to the plane of the retarder. Thus the material 430 of the C-plate retarder may have a negative dielectric anisotropy. C-plates may comprise transparent birefringent materials such as: polycarbonates or reactive mesogens that are cast onto a substrate that provides homeotropic alignment for example: Zeonex™ Cyclo Olefin Polymer (COP); discotic polymers; and Nitto Denko™ double stretched polycarbonates.

The switchable liquid crystal retarder of FIGS. 6A-C further comprise surface alignment layers 418A, 418B disposed adjacent to the layer of non-curable liquid crystal material 414 and each arranged to provide homogenous alignment in the adjacent liquid crystal layer 314. In other words, the switchable liquid crystal retarder comprises two surface alignment layers 418A, 418B disposed adjacent to the layer of non-curable liquid crystal material 414 and on opposite sides thereof and each arranged to provide homogeneous alignment in the adjacent non-curable liquid crystal material 414. The substrates that are provided by passive compensation retarders 330A, 330B may have reduced thickness and stiffness compared to the substrates of FIG. 1A for example, which may use a glass material for example. Advantageously the present embodiments achieve increased resilience of the layer 314 to applied mechanical force during touch operation. Such displays may also be foldable or bendable. Advantageously increased resilience to folding or bending of the display may be achieved. Very low thickness may be achieved.

The optical output of the arrangement of FIGS. 6A and 6B will now be described.

Figure 7A:
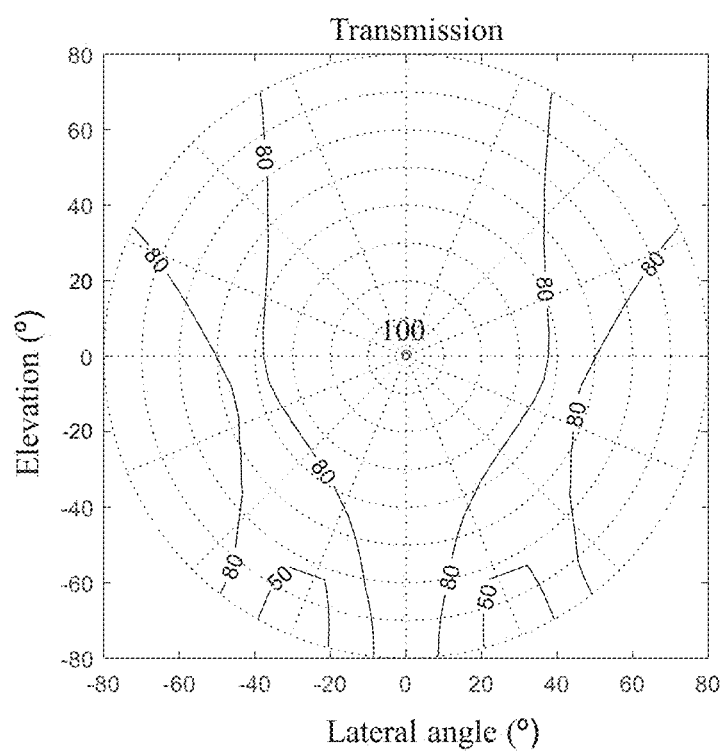
FIG. 7A is a schematic graph illustrating the variation of transmitted luminance with polar direction for transmitted light rays in FIG. 6B in a public mode of operation.
Figure 7B:
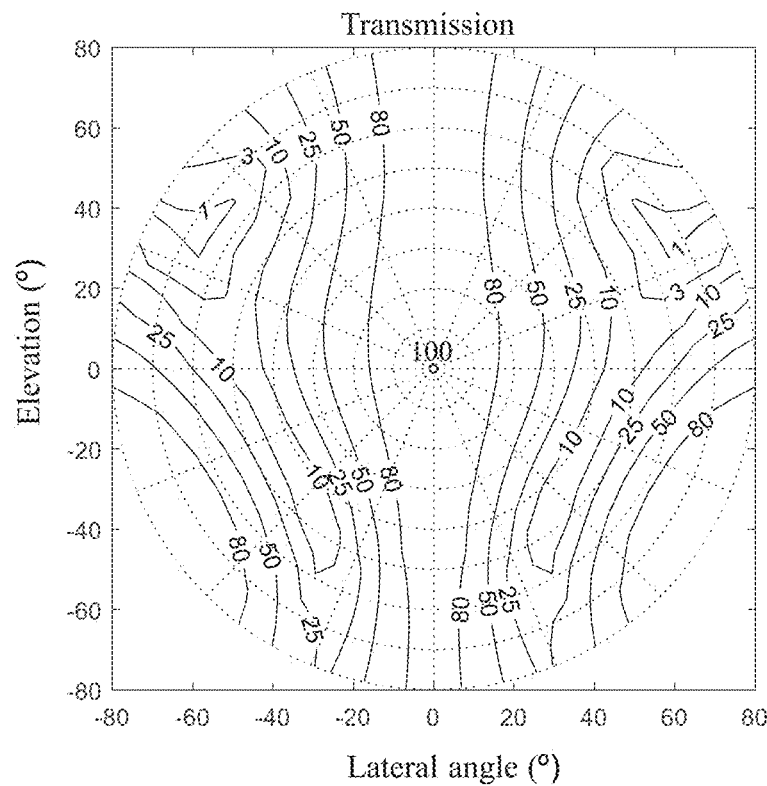
FIG. 7B is a schematic graph illustrating the variation in transmitted luminance with polar direction for transmitted light rays in FIG. 6A in a privacy mode of operation.
Figure 7C:
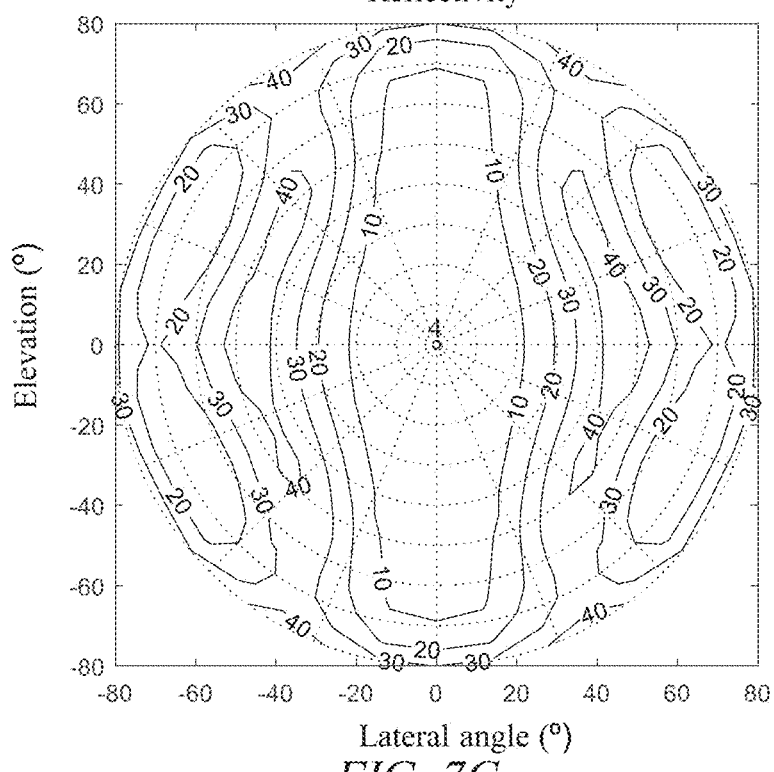
FIG. 7C is a schematic graph illustrating the variation of reflectivity with polar direction for reflected light rays in FIG. 6A in a privacy mode of operation.

FIG. 7A is a schematic graph illustrating the variation of transmitted luminance with polar direction for transmitted light rays in FIG. 6B in a public mode of operation; FIG. 7B is a schematic graph illustrating the variation in transmitted luminance with polar direction for transmitted light rays in FIG. 6A in a privacy mode of operation; FIG. 7C is a schematic graph illustrating the variation of reflectivity with polar direction for reflected light rays in FIG. 6A in a privacy mode of operation comprising the arrangement described in TABLE 2.

TABLE 2

| | Passive polar control retarder(s) | | Active LC retarder | | | | |
| --- | --- | --- | --- | --- | --- | --- | --- |
| Mode | Type | $\Delta n.d/$ nm | Alignment layers | Pretilt/ deg | $\Delta n.d/$ nm | $\Delta \varepsilon$ | Voltage/ V |
| Public | Negative C, 330A | −275 | Homogeneous | 2 | 750 | 13.2 | 5.0 (V2) |
| Privacy | Negative C, 330B | −275 | Homogeneous | 2 | | | 2.6 (V1) |

The passive polar control retarder 330 comprises first and second C-plates 330A, 330B; and the switchable liquid crystal layer 314 is provided between the first and second C-plates 330A, 330B. The switchable liquid crystal retarder 301 comprises two surface alignment layers 418A, 418B disposed adjacent to the layer 314 of non-curable liquid crystal material 414 and on opposite sides thereof and each arranged to provide homogeneous alignment in the adjacent non-curable liquid crystal material 414. The layer of non-curable liquid crystal material 414 of the switchable liquid crystal retarder 301 comprises a non-curable liquid crystal material 414 with a positive dielectric anisotropy.

In the present embodiments, desirable ranges for retardations and voltages have been established by means of simulation of retarder stacks and experiment with display optical stacks. Ranges for retardances will now be described that provide design configurations for various optical layers.

The layer of liquid crystal material 314 has a retardance for light of a wavelength of 550 nm in a range from 500 nm to 1000 nm, preferably in a range from 600 nm to 900 nm and most preferably in a range from 700 nm to 850 nm. The two passive retarders 330A, 330B each comprises a passive retarder having an optical axis perpendicular to the plane of the retarder and the total retardance of the two passive retarders for light of a wavelength of 550 nm is in a range from −300 nm to −700 nm, preferably in a range from −350 nm to −600 nm and most preferably in a range from −400 nm to −500 nm.

Advantageously high optical performance can be achieved in privacy and public modes of operation in very low thickness embodiments.

The operation of privacy displays will now be described further.

Figure 8A:
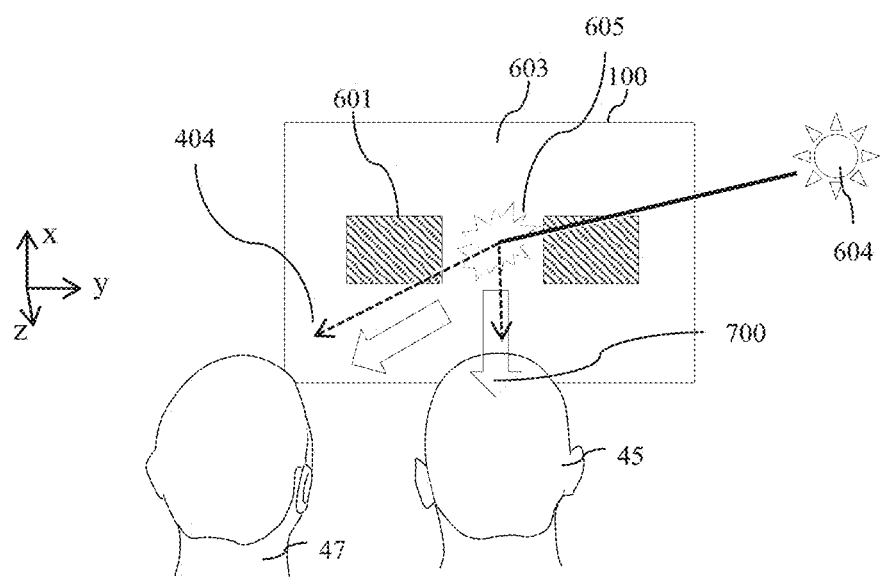
FIG. 8A is a schematic diagram illustrating in front perspective view observation of reflected ambient light from interface surfaces of a display of FIG. 1A operating in public mode.

FIG. 8A is a schematic diagram illustrating in front perspective view observation of reflected ambient light from interface surfaces of a display of FIG. 1A operating in public mode.

Display 100 may be provided with white regions 603 and black regions 601. A snooper 47 may observe an image on the display if luminance difference between the observed regions 601, 603 can be perceived. In operation, primary user 45 observes a full luminance images by rays 700 to viewing locations 26 that may be optical windows of a directional display. Snooper 47 observes reduced luminance rays 402 in viewing locations 27 that may for example be optical windows of a directional display comprising an imaging waveguide. Regions 26, 27 further represent on-axis and off-axis regions of polar graphs of FIGS. 3C-D.

Thus some light rays 404 may be reflected by the front surface of the additional polarizer 318 and other surfaces of the display. Typically, such reflectivity may be 4% for a bonded optical stack at normal incidence and approximately 5% for a bonded optical stack for 45 degrees incidence, due to Fresnel reflections at the air-polarizer interface. Thus a low luminance reflected image 605 of source 604 may be observed by the snooper on the front of the display 100.

Figure 8B:
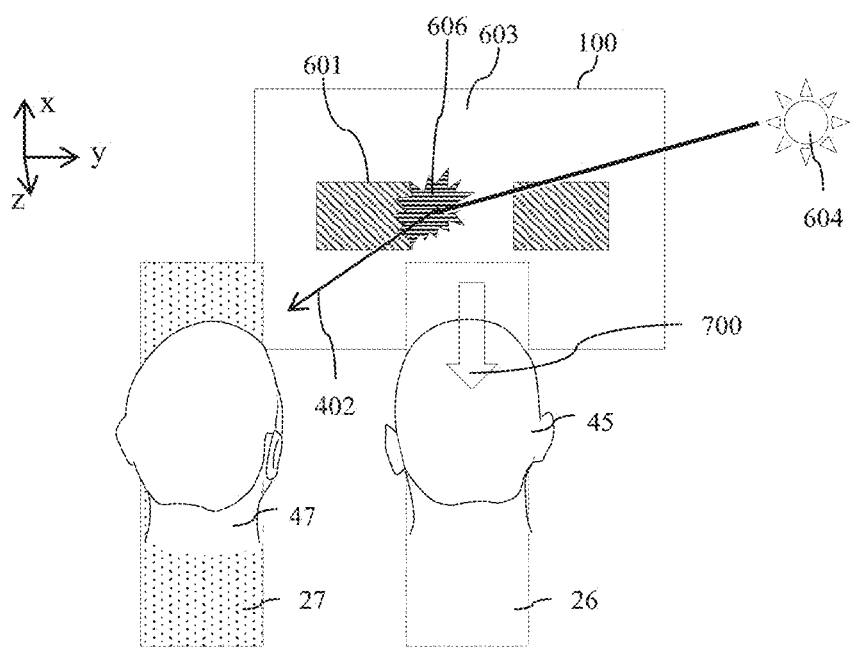
FIG. 8B is a schematic diagram illustrating in front perspective view observation of reflected ambient light for the display of FIG. 1A operating in privacy mode.

FIG. 8B is a schematic diagram illustrating in front perspective view observation of reflected ambient light for the display of FIG. 1A operating in privacy mode. Regions 26, 27 further represent on-axis and off-axis regions of polar graphs of FIGS. 3A-B. By way of comparison with FIG. 8A, substantially higher reflected luminance is observable from reflection 606 of source 604 for the off-axis snooper 47 in off-axis location 27. By comparison, user 45 in location 26 sees a low reflectivity image with high luminance. The shape and distribution of the reflected image 606 is determined by the ambient light source 604 spatial distribution but may be further determined by diffusion layers, particularly at the output surface of the additional polarizer 318.

Advantageously the image seen by user 45 has high luminance and image visibility and the image seen by snooper 47 has low luminance and high visual security level.

Features of the arrangement of FIGS. 8A-C not discussed in further detail may be assumed to correspond to the features with equivalent reference numerals as discussed above, including any potential variations in the features.

The appearance of artefacts due to applied force applied to liquid crystal layers without the cured liquid crystal material 420 of the present embodiments will now be described.

Figure 9A:
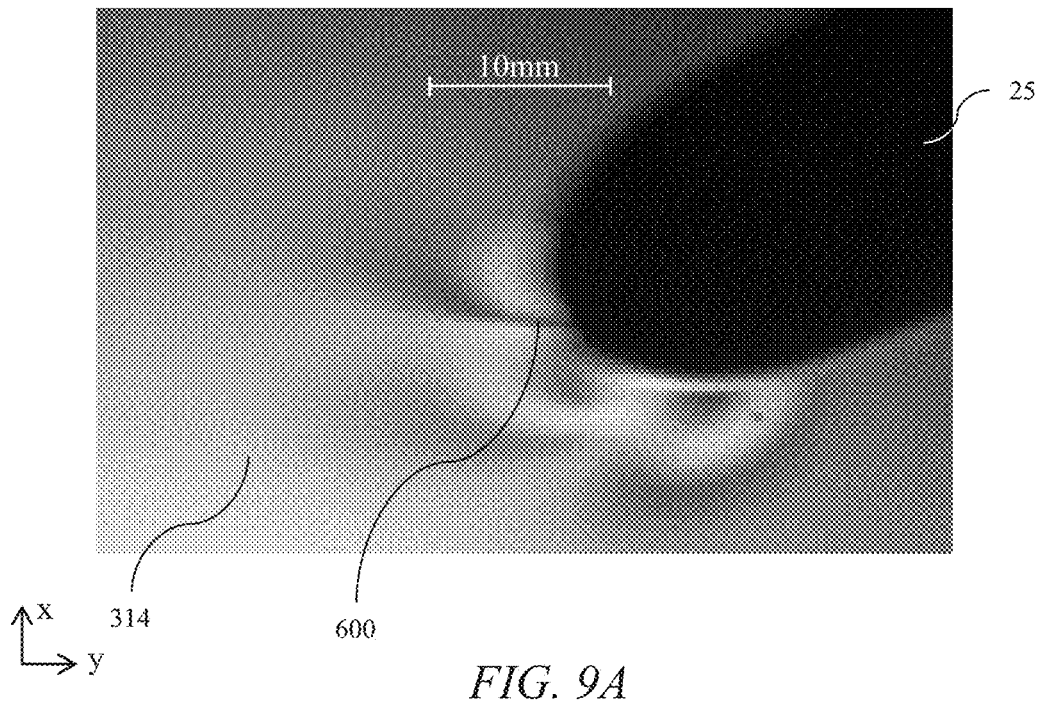
FIG. 9A is a photo showing appearance of disclinations in a nematic liquid crystal layer that does not comprise the cured liquid crystal material of the present embodiments during application of pressure.
Figure 9B:
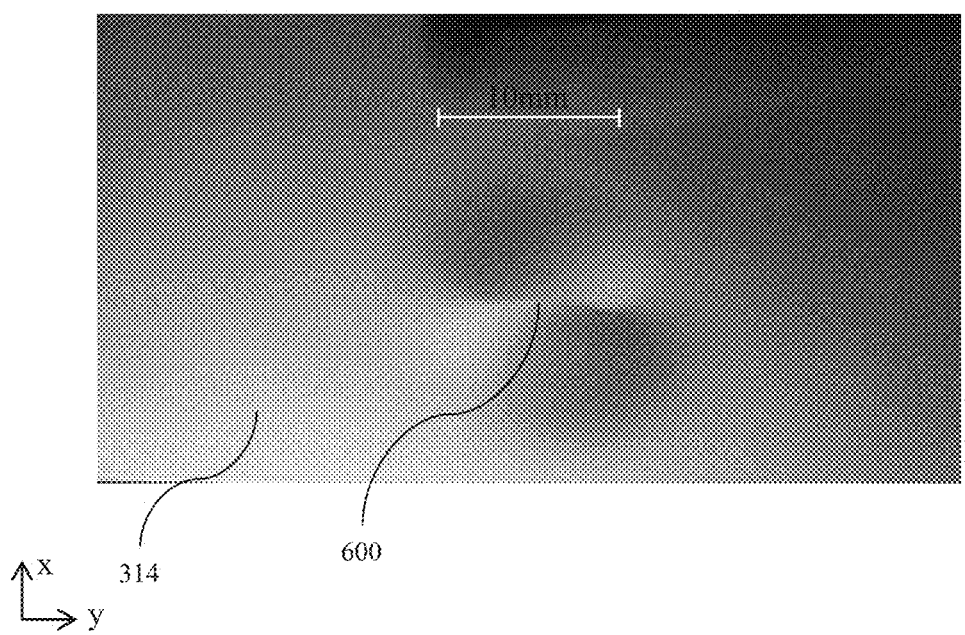
FIG. 9B is a photo showing appearance of disclinations in a nematic liquid crystal layer that does not comprise the cured liquid crystal material of the present embodiments shortly after release of pressure and before complete annealing of the disclinations.

FIG. 9A is a photo showing appearance of disclinations 600 in a nematic liquid crystal layer 314 that does not comprise the cured liquid crystal material of the present embodiments during application of pressure by a finger 25; and FIG. 9B is a photo showing appearance of disclinations 600 in a nematic liquid crystal layer that does not comprise the cured liquid crystal material of the present embodiments shortly after release of pressure and before complete annealing of the disclinations.

Such disclinations provide undesirable image artefacts over relatively large areas and that last several seconds, and are unacceptable for display appearance.

It would be desirable to provide increased uniformity of public mode of operation.

Figure 10A:
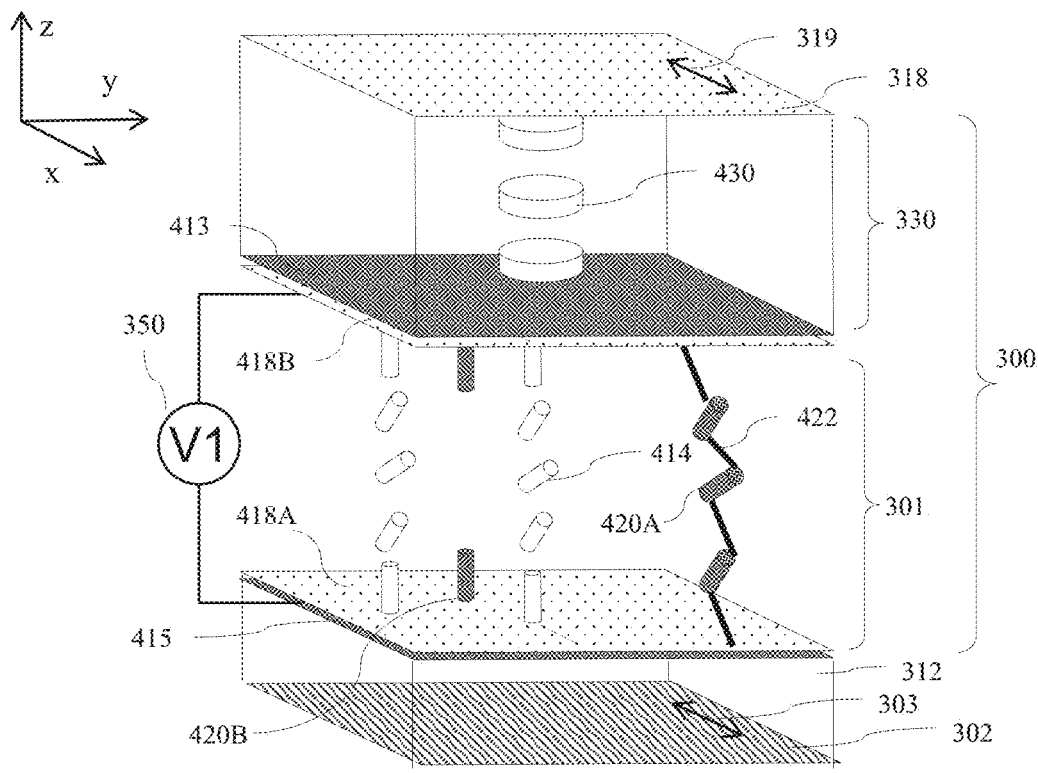
FIG. 10A is a schematic diagram illustrating in perspective side view an arrangement of a switchable compensated retarder comprising a homeotropically aligned switchable liquid crystal retarder and a negative C-plate in a privacy mode of operation.
Figure 10B:
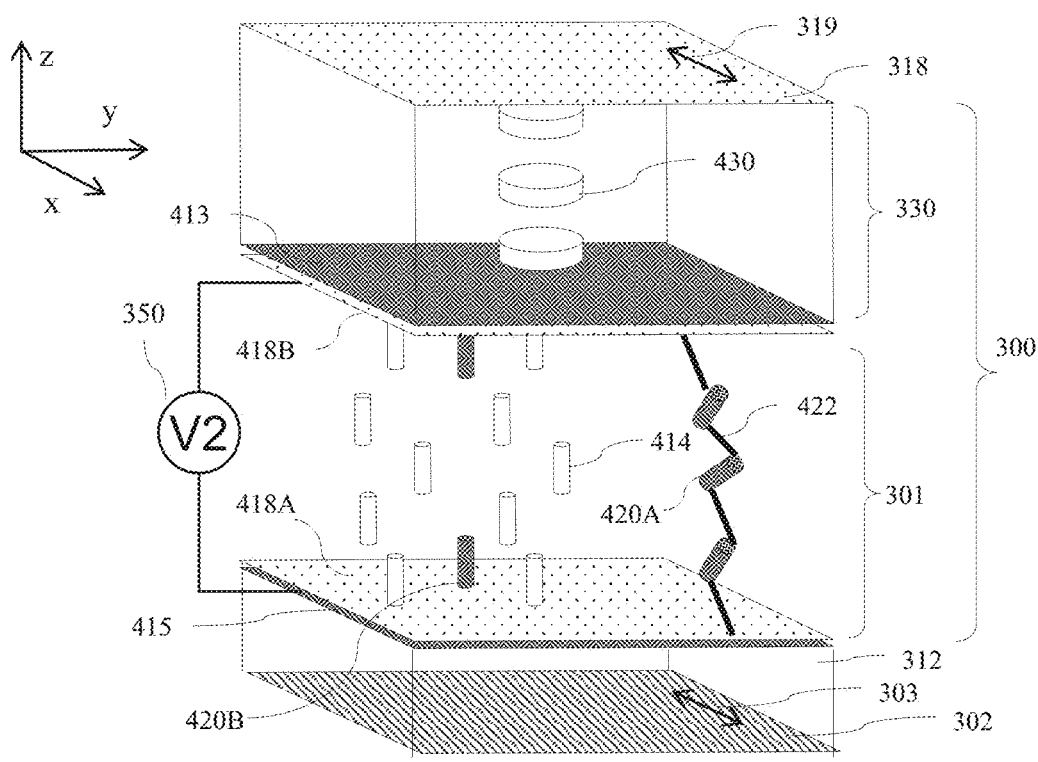
FIG. 10B is a schematic diagram illustrating a graph of liquid crystal director angle against fractional location through the switchable liquid crystal retarder cell of FIG. 10A for no applied voltage to provide operation in a public mode of operation.

FIG. 10A is a schematic diagram illustrating in perspective side view an arrangement of a switchable compensated retarder 300 comprising a homeotropically aligned switchable liquid crystal retarder 301 and a negative C-plate 330 in a privacy mode of operation; and FIG. 10B is a schematic diagram illustrating a graph of liquid crystal director angle against fractional location through the switchable liquid crystal retarder cell of FIG. 10A for no applied voltage to provide operation in a public mode of operation.

The substrate 316 may be provided by the retarder 330 to advantageously reduce thickness while the substrate 312 may be provided by a stiffer substrate material such as glass to increase rigidity and advantageously reduce the visibility of artefacts arising from applied force during touch operation.

The switchable liquid crystal retarder 301 comprises two surface alignment layers 418A, 418B disposed adjacent to the non-curable liquid crystal material 414 on opposite sides thereof and arranged to provide homeotropic alignment at the adjacent non-curable liquid crystal material 414. The non-curable liquid crystal material 414 may be provided with a pretilt, for example 88 degrees from the horizontal to remove degeneracy of non-curable liquid crystal material 414 alignment. The cured liquid crystal material 420 may have the same alignment as for the non-curable liquid crystal material 420 when driven with the privacy mode voltage V1. Thus in the public mode the alignment of the materials 414, 420 is different and advantageously some scatter may be provided to increase uniformity.

Figures 11A, 11B:
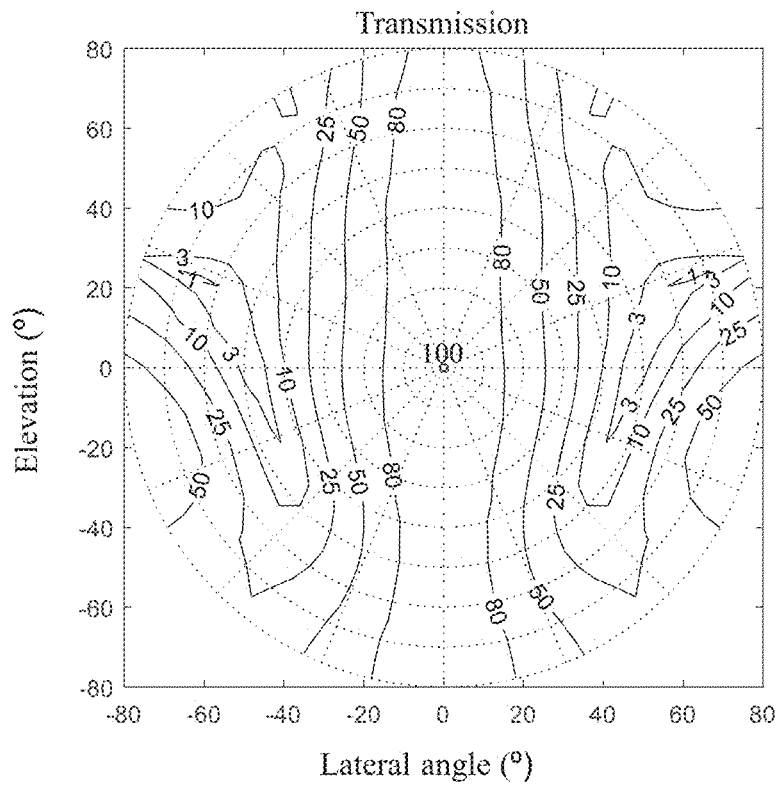
FIG. 11A is a schematic graph illustrating the variation of output luminance with polar direction for transmitted light rays in FIG. 10A in a privacy mode of operation.
FIG. 11B is a schematic graph illustrating the variation in reflectivity with polar direction for reflected light rays in FIG. 10A in a privacy mode of operation.
Figure 11C:
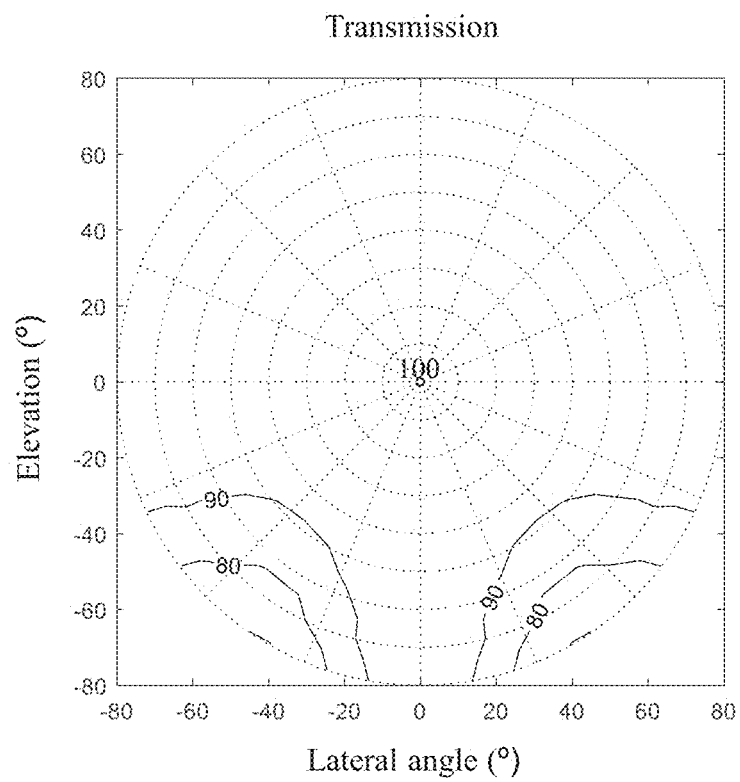
FIG. 11C is a schematic graph illustrating the variation of output luminance with polar direction for transmitted light rays in FIG. 10B in a public mode of operation.
Figure 11D:
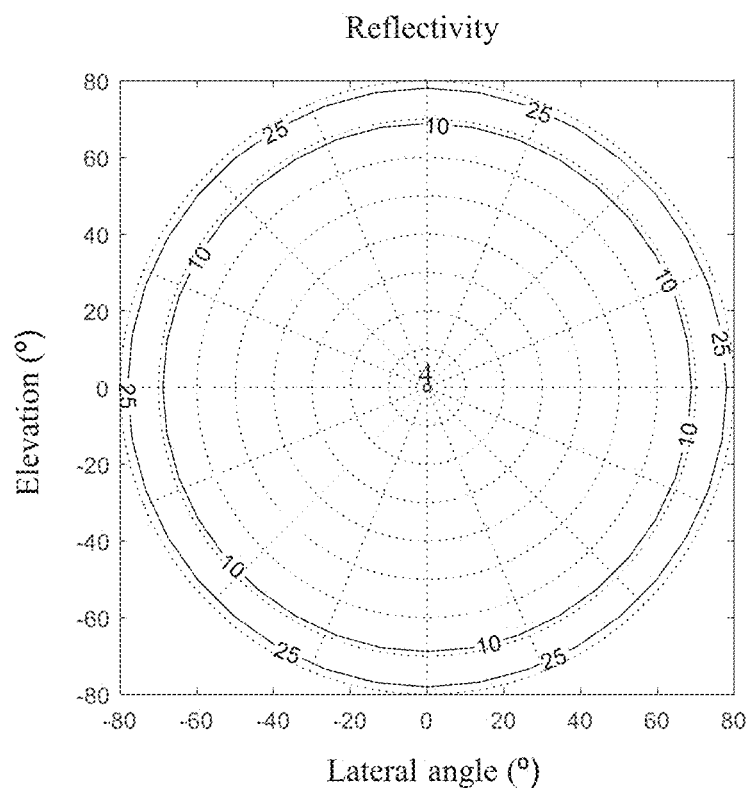
FIG. 11D is a schematic graph illustrating the variation in reflectivity with polar direction for reflected light rays in FIG. 10B in a public mode of operation.

FIG. 11A is a schematic graph illustrating the variation of output luminance with polar direction for transmitted light rays in FIG. 10A in a privacy mode of operation; FIG. 11B is a schematic graph illustrating the variation in reflectivity with polar direction for reflected light rays in FIG. 10A in a privacy mode of operation; FIG. 11C is a schematic graph illustrating the variation of output luminance with polar direction for transmitted light rays in FIG. 10B in a public mode of operation; and FIG. 11D is a schematic graph illustrating the variation in reflectivity with polar direction for reflected light rays in FIG. 10B in a public mode of operation comprising the arrangement described in TABLE 3.

TABLE 3

| | Passive polar control retarder(s) | | Active LC retarder | | | | |
|---|---|---|---|---|---|---|---|
| Mode | Type | Δn.d/ nm | Alignment layers | Pretilt/ deg | Δn.d/ nm | Δε | Voltage/ V |
| Public | Negative C | −700 | Homo-geneous | 88 | 810 | −4.3 | 0 (V2) |
| Privacy | | | Homo-geneous | 88 | | | 2.2 (V1) |

In comparison to the embodiments of TABLES 1 and 2, the liquid crystal retarder alignment is provided by a homeotropic rather than homogeneous alignment. Advantageously the wide angle mode performance of FIGS. 11C-D is improved with respect to FIGS. 3C-D. Further the power consumption of the public mode is reduced because of the low drive voltage.

The layer of liquid crystal material of the switchable liquid crystal retarder comprises a liquid crystal material with a negative dielectric anisotropy.

The switchable liquid crystal retarder 301 comprises two surface alignment layers 418A, 418B disposed adjacent to the non-curable liquid crystal material 414 on opposite sides thereof and each arranged to provide homeotropic alignment at the adjacent non-curable liquid crystal material 414.

In the present embodiments, desirable ranges for retardations and voltages have been established by means of simulation of retarder stacks and experiment with display optical stacks. Ranges for retardances will now be described that provide design configurations for various optical layers.

The layer of liquid crystal material has a retardance for light of a wavelength of 550 nm in a range from 500 nm to 1000 nm, preferably in a range from 600 nm to 900 nm and most preferably in a range from 700 nm to 850 nm.

The at least one passive retarder comprises a passive retarder having an optical axis perpendicular to the plane of the retarder, the passive retarder having a retardance for light of a wavelength of 550 nm in a range from −300 nm to −900 nm, preferably in a range from −450 nm to −800 nm and most preferably in a range from −500 nm to −725 nm; or (not shown) the at least one passive retarder comprises a pair of passive retarders which have optical axes in the plane of the retarders that are crossed, each passive retarder of the pair of passive retarders having a retardance for light of a wavelength of 550 nm in a range from 300 nm to 800 nm, preferably in a range from 500 nm to 700 nm and most preferably in a range from 550 nm to 675 nm.

The switchable liquid crystal retarder 301 comprises two surface alignment layers disposed on electrodes 413, 415 and adjacent to the layer of non-curable liquid crystal material 414 and on opposite sides thereof and each arranged to provide homeotropic alignment in the adjacent non-curable liquid crystal material 414. The layer of non-curable liquid crystal material 414 of the switchable liquid crystal retarder 301 comprises a liquid crystal material with a negative dielectric anisotropy. The liquid crystal molecules 414 may be provided with a pretilt, for example 88 degrees from the horizontal to remove degeneracy in switching.

Figure 11E:
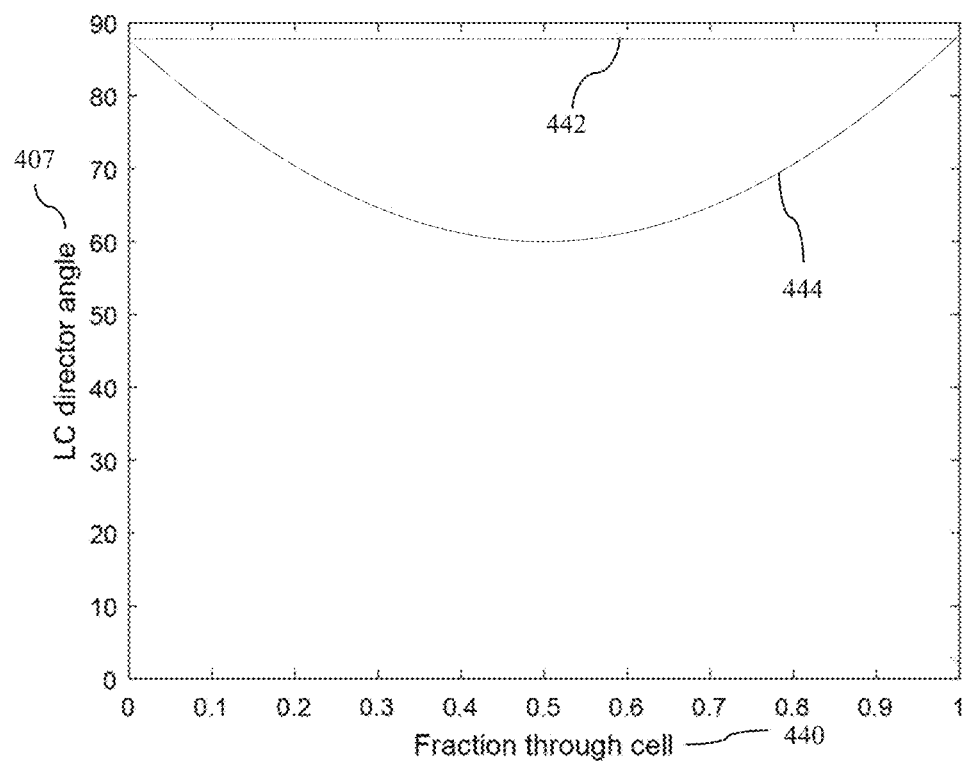
FIG. 11E is a schematic diagram illustrating a graph of liquid crystal director angle against fractional location through the switchable liquid crystal retarder cells of FIGS. 10A-B for different applied voltages.

FIG. 11E is a schematic diagram illustrating a graph of liquid crystal director angle 407 against fractional location 440 through the switchable liquid crystal retarder cell, where the fractional location 440 varies between 0 for a location at the surface alignment layer 409 and 1 for a location at the surface alignment layer 411. FIG. 11E differs from FIG. 4 as the pretilt angle is large and reduces with applied voltage.

For a homeotropically aligned mode with no voltage applied as illustrated in FIG. 6A, the liquid crystal directors are at a tilt 407 of 88 degrees through the thickness of the cell as indicated by tilt profile 442. The tilt profile for the layer 314 may be the same as the profile 442. The compensation retarder 330 may provide correction for the pretilt direction of the switchable liquid crystal retarder 301. The compensation retarder 330 may alternatively have a uniform tilt angle of 90 degrees, such difference from the pretilt of the liquid crystal layer providing only small difference in off-axis viewing properties. The non-curable liquid crystal material 414 switches between profiles 442 in public mode and 444 in privacy mode while the cured liquid crystal material 420 maintains the profile 444 in both modes of operation.

A method to form the switchable liquid crystal layer of FIGS. 10A-B will now be described.

FIGS. 12A-D are schematic diagrams illustrating in a perspective side view a method to provide a liquid crystal polymer stabilised switchable liquid crystal retarder for a privacy display comprising homeotropic alignment layers. The method of FIGS. 12A-D is similar to that of FIGS. 5A-D other than the liquid crystal materials 414, 420 comprise negative dielectric anisotropy materials and homeotropic alignment layers 418A, 418B are provided.

A method to manufacture a liquid crystal retarder for a privacy display device 100 comprises the steps of: (i) providing first and second transparent support substrates 312, 316 with electrodes 413, 415 on at least one side of each of the first and second transparent support substrates 312, 316; (ii) forming a liquid crystal alignment layer on an electrode 413, 415 of each of the first and second transparent support substrates 312, 316; (iii) providing a liquid crystal layer 314 between the alignment layers; wherein the liquid crystal layer 314 comprises (a) a non-curable liquid crystal material 414 and (b) a cured liquid crystal material 420; and the liquid crystal layer 314 has a retardance for light of a wavelength of 550 nm in a range from 500 nm to 1000 nm, preferably in a range from 600 nm to 900 nm and most preferably in a range from 700 nm to 850 nm; (iv) applying a curing step voltage across the electrodes; and (v) curing the curable liquid crystal material 420. The curing step voltage V1 is the voltage at which the liquid crystal retarder is driven to provide a privacy mode of operation of the display device (such as illustrated in FIG. 2A). The curable liquid crystal material 420 comprises a photo-initiator and the step of curing the curable liquid crystal material comprises illumination by ultraviolet radiation 720.

Figure 12A:
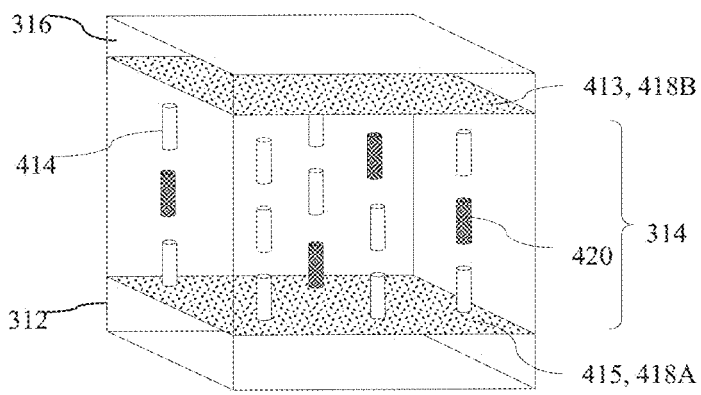
FIG. 12A, FIG. 12B, FIG. 12C, and FIG. 12D are schematic diagrams illustrating in a perspective side view a method to provide a liquid crystal polymer stabilised switchable liquid crystal retarder for a privacy display comprising homeotropic alignment layers.

In further detail, as illustrated in FIG. 12A, in a first step a liquid crystal layer is provided, wherein the liquid crystal material comprises non-curable liquid crystal molecules 414 and curable liquid crystal molecules 420. Alignment layers (not shown) are arranged to provide alignment, such as homogeneous alignment at each surface by means of anti-parallel pre-tilt alignments.

Figure 12B:
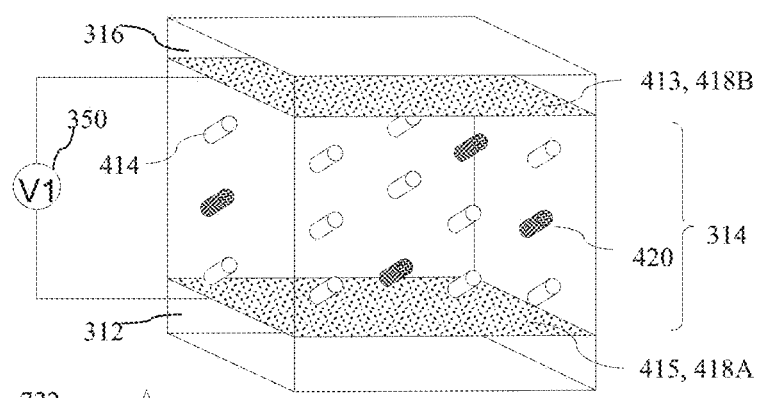

As illustrated in FIG. 12B, a voltage may be applied across the liquid crystal layer 413 by means of electrodes 413, 415. The voltage may be substantially the same voltage V1 provided to achieve the liquid crystal alignment state for privacy operation.

Figure 12C:
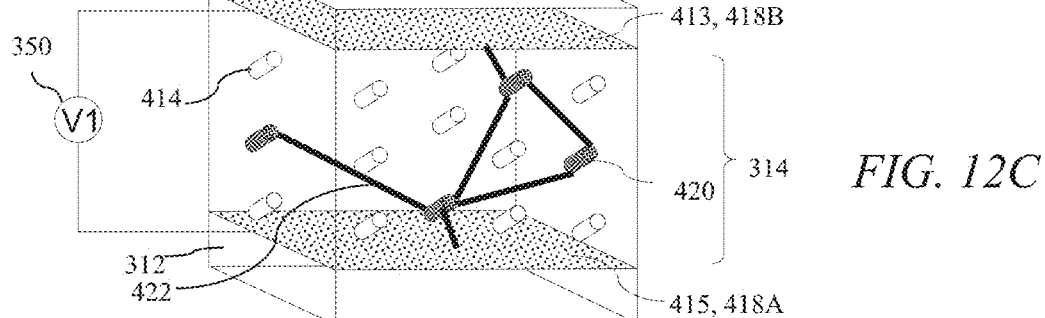

As illustrated in FIG. 12C, the cell may be cured while the voltage remains applied. Curable liquid crystal material 420 may comprise for example reactive mesogen molecules, with a similar birefringence to that of the non-curable liquid crystal material 414 and a photo initiator.

Figure 12D:
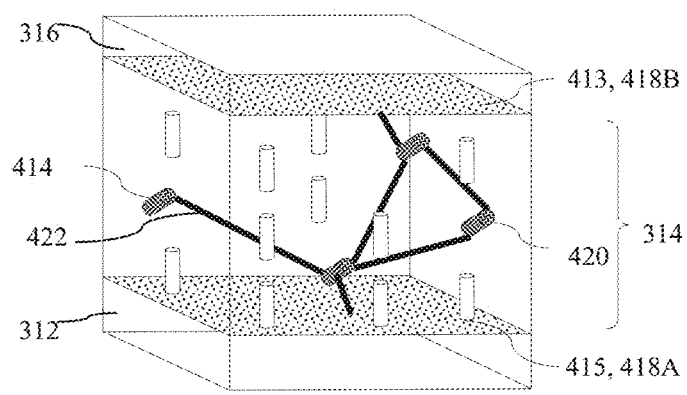

As illustrated in FIG. 12D, after cure the light source 722 and voltage driver are removed and the molecules of the non-curable liquid crystal material 414 relax while the molecules of the cured liquid crystal material 420 remain in the cured liquid crystal network 424 comprising the molecular orientation of the driven state.

The operation of polar control retarder layers between parallel polarizers for off-axis illumination will now be described further. In the various devices described above, at least one polar control retarder is arranged between the reflective polarizer 318 and the additional polarizer 218 in various different configurations. In each case, the at least one polar control retarder is configured so that it does not affect the luminance of light passing through the reflective polarizer 318, the at least one polar control retarder, and the additional polarizer 218 along an axis along a normal to the plane of the polar control retarder(s) but it does reduce the luminance of light passing through the reflective polarizer 318, the at least one polar control retarder, and the additional polarizer 218 along an axis inclined to a normal to the plane of the polar control retarder(s), at least in one of the switchable states of the compensated switchable polar control polar control retarder 300. There will now be given a description of this effect in more detail, the principles of which may be applied in general to all of the devices described above.

Figure 13A:
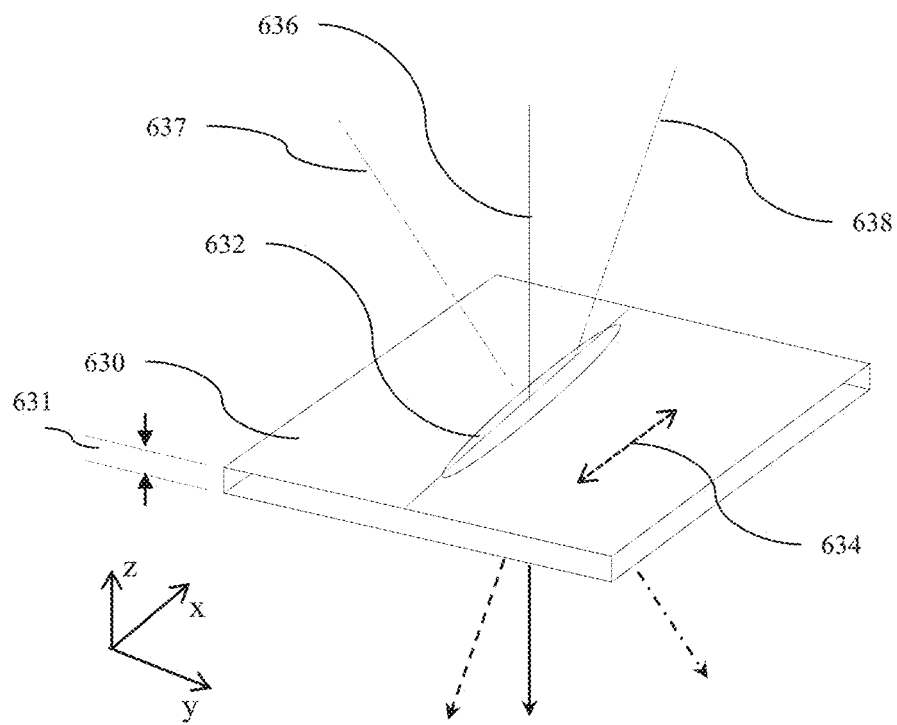
FIG. 13A is a diagram illustrating in perspective view illumination of a retarder layer by off-axis light.

FIG. 13A is a schematic diagram illustrating in perspective view illumination of a polar control retarder layer by off-axis light. Polar control retarder 630 may comprise birefringent material, represented by refractive index ellipsoid 632 with optical axis direction 634 at 0 degrees to the x-axis, and have a thickness 631. Features of the arrangements of FIGS. 13A-15E below that are not discussed in further detail may be assumed to correspond to the features with equivalent reference numerals as discussed above, including any potential variations in the features.

Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the polar control retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the polar control retarder 630 will now be described. To distinguish from the first and second polarization components during operation in a directional backlight 101, the following explanation will refer to third and fourth polarization components.

Figure 13B:
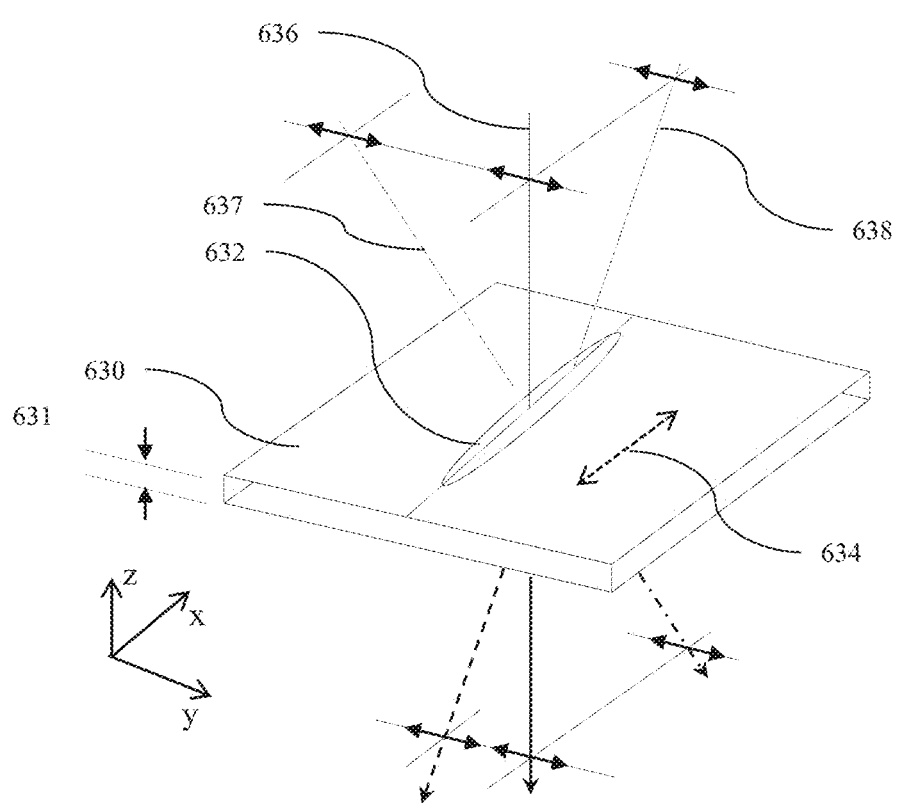
FIG. 13B is a diagram illustrating in perspective view illumination of a retarder layer by off-axis light of a first linear polarization state at 0 degrees.
Figure 13C:
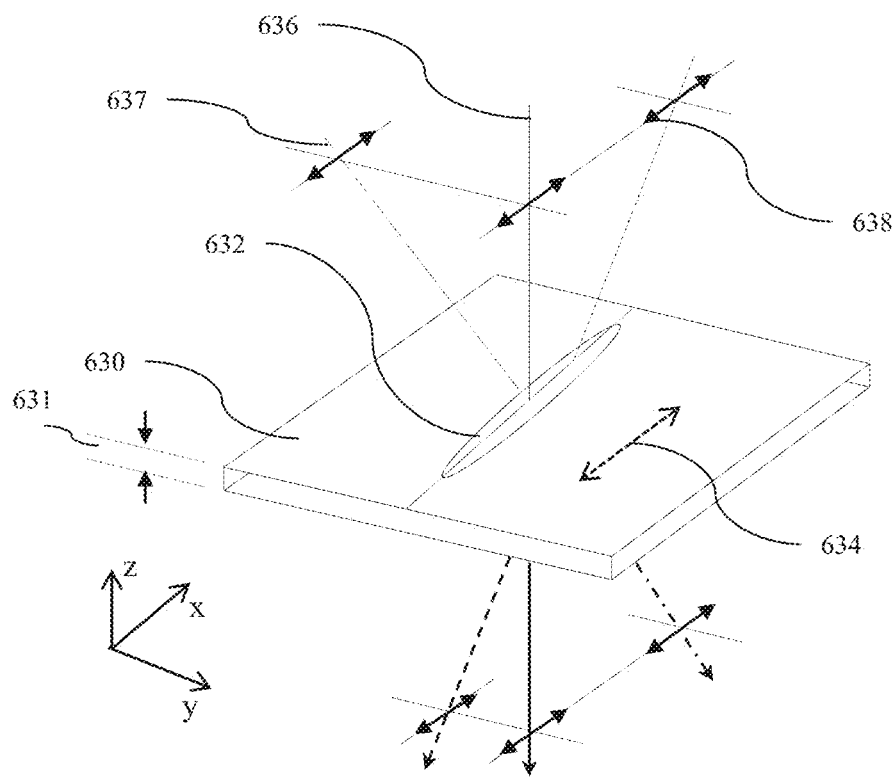
FIG. 13C is a diagram illustrating in perspective view illumination of a retarder layer by off-axis light of a first linear polarization state at 90 degrees.

FIG. 13B is a schematic diagram illustrating in perspective view illumination of a polar control retarder layer by off-axis light of a third linear polarization state at 90 degrees to the x-axis and FIG. 13C is a schematic diagram illustrating in perspective view illumination of a polar control retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the polar control retarder 630 introduces no phase shift to polarisation components of light passed by the polarizer on the input side of the polar control retarder 630 along an axis along a normal to the plane of the polar control retarder 630. Accordingly, the polar control retarder 630 does not affect the luminance of light passing through the polar control retarder 630 and polarizers (not shown) on each side of the polar control retarder 630. Although FIGS. 29A-C relate specifically to the polar control retarder 630 that is passive, a similar effect is achieved by the polar control retarders in the devices described above.

Figure 13D:
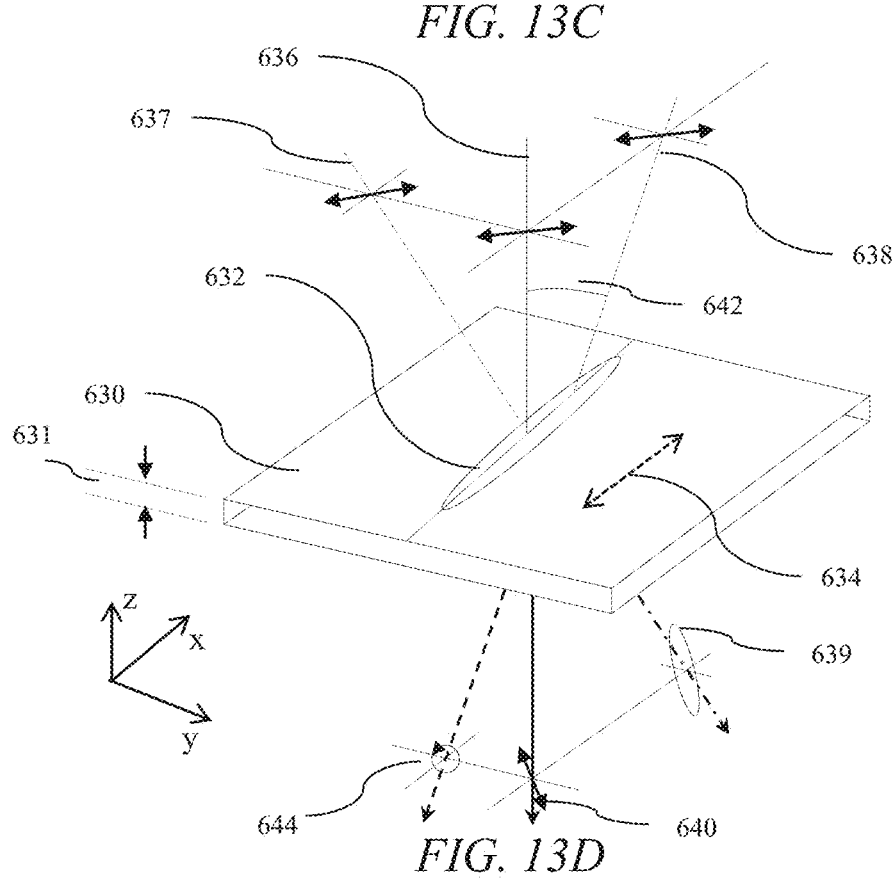
FIG. 13D is a diagram illustrating in perspective view illumination of a retarder layer by off-axis light of a first linear polarization state at 45 degrees.

FIG. 13D is a schematic diagram illustrating in perspective view illumination of a polar control retarder 630 layer by off-axis light of a linear polarization state at 45 degrees. The linear polarization state may be resolved into third and fourth polarization components that are respectively orthogonal and parallel to optical axis 634 direction. The polar control retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the polar control retarder 630 introduces a phase shift to polarisation components of light passed by the polarizer on the input side of the polar control retarder 630 along an axis corresponding to ray 638 that is inclined to a normal to the plane of the polar control retarder 630. Although FIG. 29D relates to the polar control retarder 630 that is passive, a similar effect is achieved by the polar control retarders described above, in a switchable state of the switchable liquid crystal polar control retarder corresponding to the privacy mode.

To illustrate the off-axis behaviour of polar control retarder stacks, the angular luminance control of C-plates 330A, 330B between an additional polarizer 318 and output display polarizer 218 will now be described for various off-axis illumination arrangements with reference to the operation of a C-plate between the parallel polarizers 500, 210 will now be described.

Figure 14A:
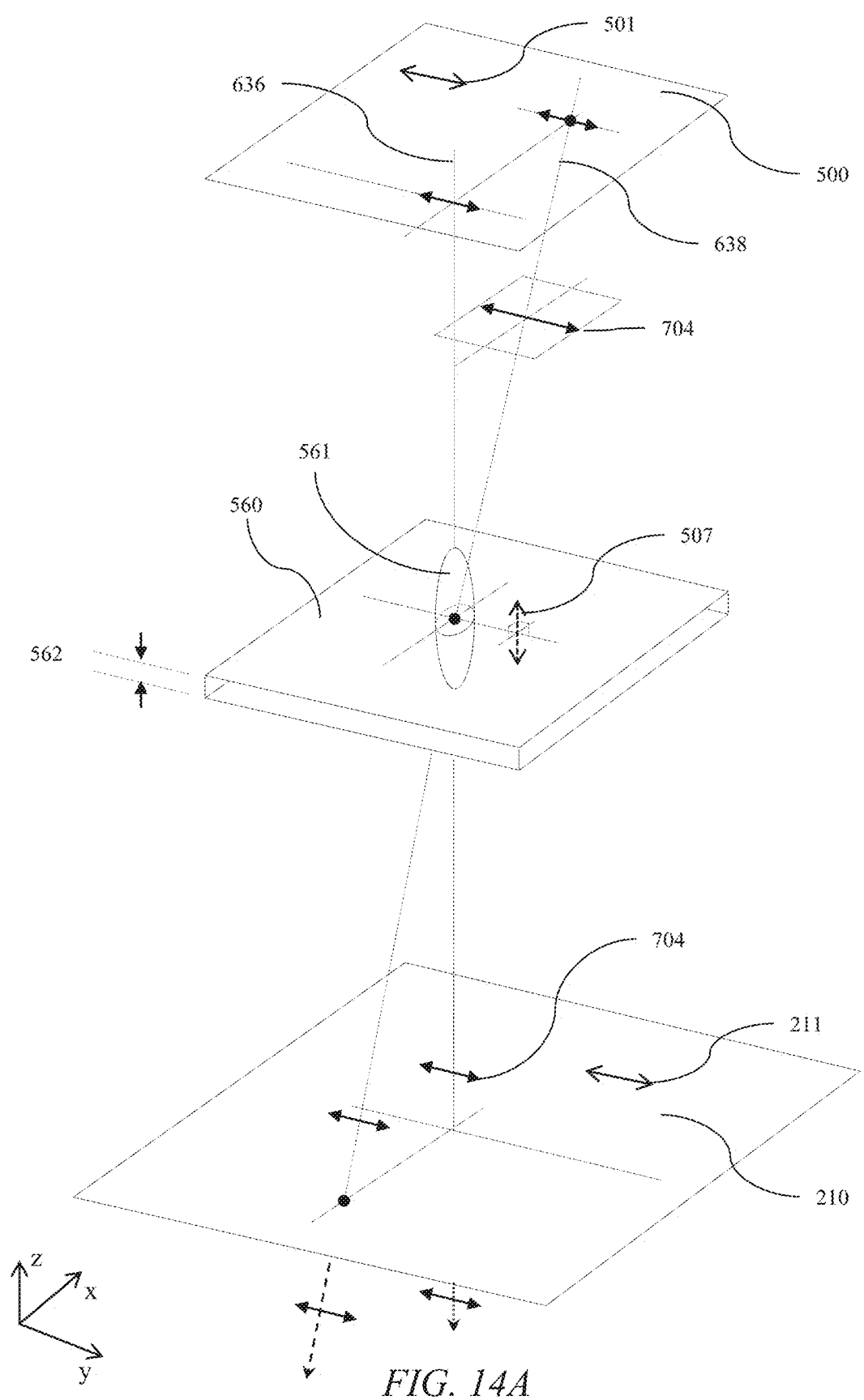
FIG. 14A is a diagram illustrating in perspective view illumination of a C-plate retarder by off-axis polarised light with a positive elevation.

FIG. 14A is a schematic diagram illustrating in perspective view illumination of a C-plate layer by off-axis polarised light with a positive elevation. Incident linear polarisation component 704 is incident onto the birefringent material 632 of the polar control retarder 560 that is a C-plate with optical axis direction 507 that is perpendicular to the plane of the polar control retarder 560. Polarisation component 704 sees no net phase difference on transmission through the liquid crystal molecule and so the output polarisation component is the same as component 704. Thus a maximum transmission is seen through the polarizer 210. Thus the polar control retarder 560 having an optical axis 561 perpendicular to the plane of the polar control retarder 560, that is the x-y plane. The polar control retarder 560 having an optical axis perpendicular to the plane of the polar control retarder comprises a C-plate.

Figure 14B:
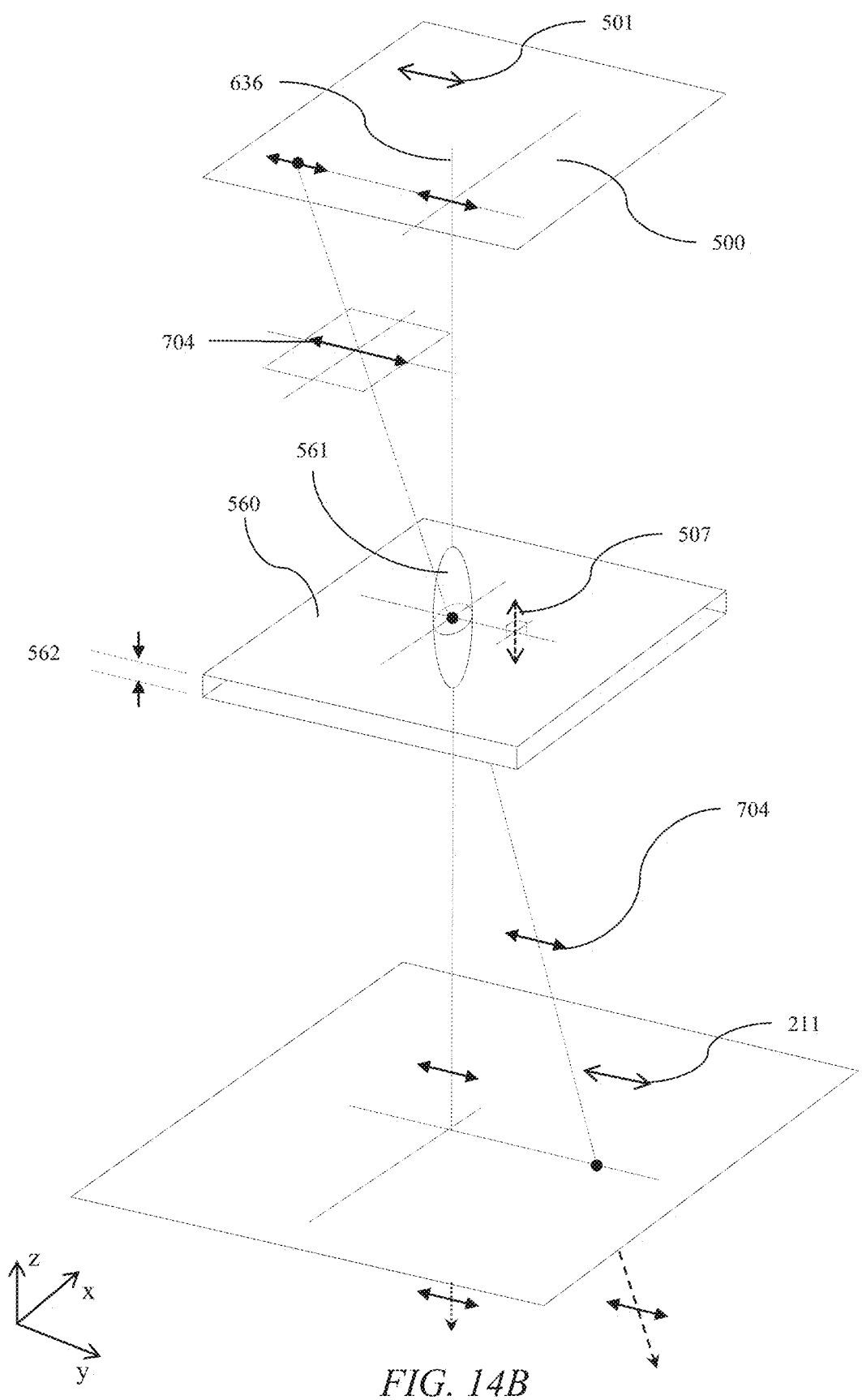
FIG. 14B is a diagram illustrating in perspective view illumination of a C-plate retarder by off-axis polarised light with a negative lateral angle.

FIG. 14B is a schematic diagram illustrating in perspective view illumination of a C-plate layer by off-axis polarised light with a negative lateral angle. As with the arrangement of FIG. 14A, polarisation state 704 sees no net phase difference and is transmitted with maximum luminance. Thus, the polar control retarder 560 introduces no phase shift to polarisation components of light passed by the polarizer on the input side of the polar control retarder 560 along an axis along a normal to the plane of the polar control retarder 560. Accordingly, the polar control retarder 560 does not affect the luminance of light passing through the polar control retarder 560 and polarizers (not shown) on each side of the polar control retarder 560. Although FIGS. 29A-C relate specifically to the polar control retarder 560 that is passive, a similar effect is achieved by the polar control retarders in the devices described above.

Figure 14C:
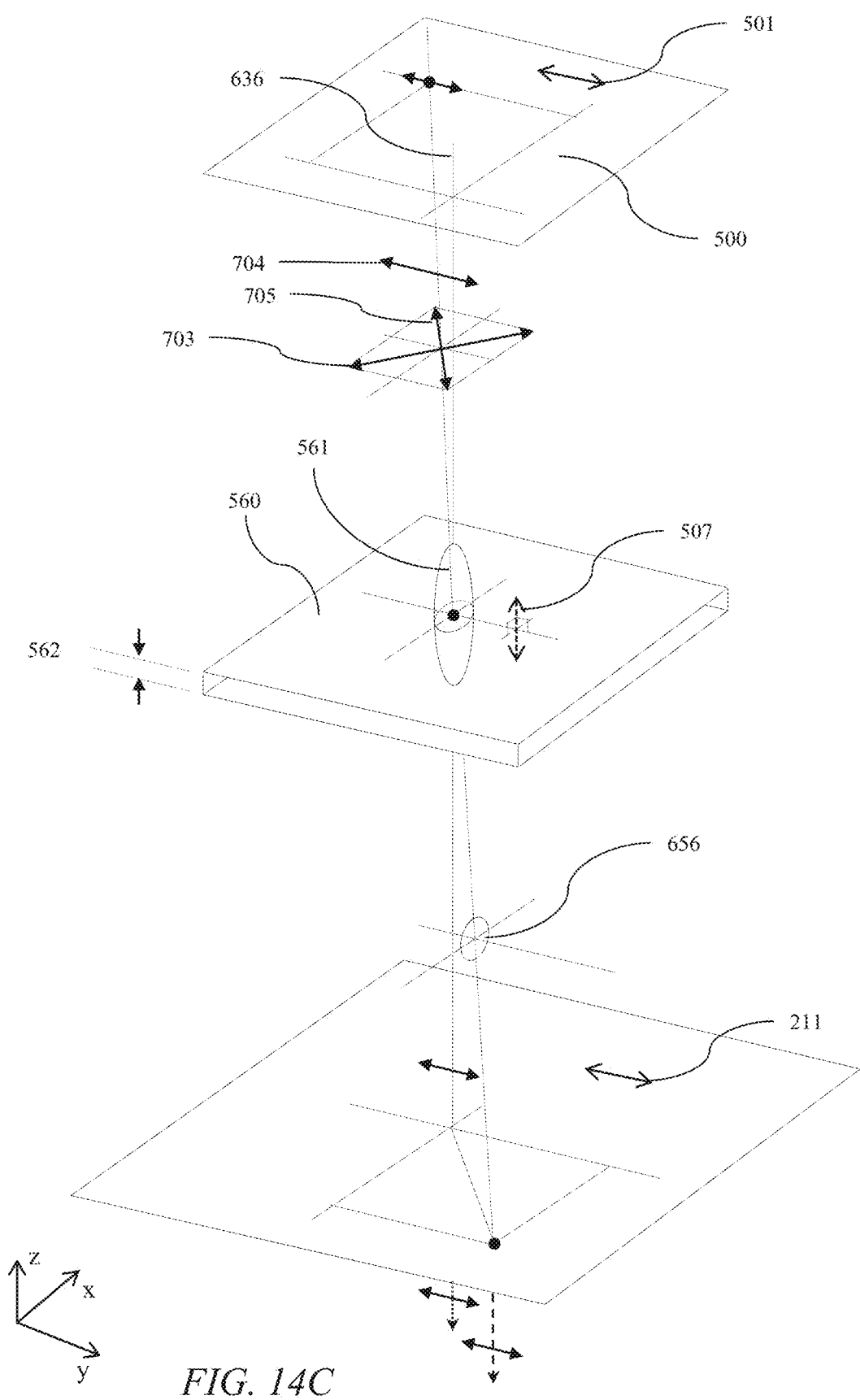
FIG. 14C is a diagram illustrating in perspective view illumination of a C-plate retarder by off-axis polarised light with a positive elevation and negative lateral angle.

FIG. 14C is a schematic diagram illustrating in perspective view illumination of a C-plate layer by off-axis polarised light with a positive elevation and negative lateral angle. In comparison to the arrangement of FIGS. 14A-B, the polarisation state 704 resolves onto eigenstates 703, 705 with respect to the birefringent material 632 providing a net phase difference on transmission through the polar control retarder 560. The resultant elliptical polarisation component 656 is transmitted through polarizer 210 with reduced luminance in comparison to the rays illustrated in FIGS. 14A-B.

Figure 14D:
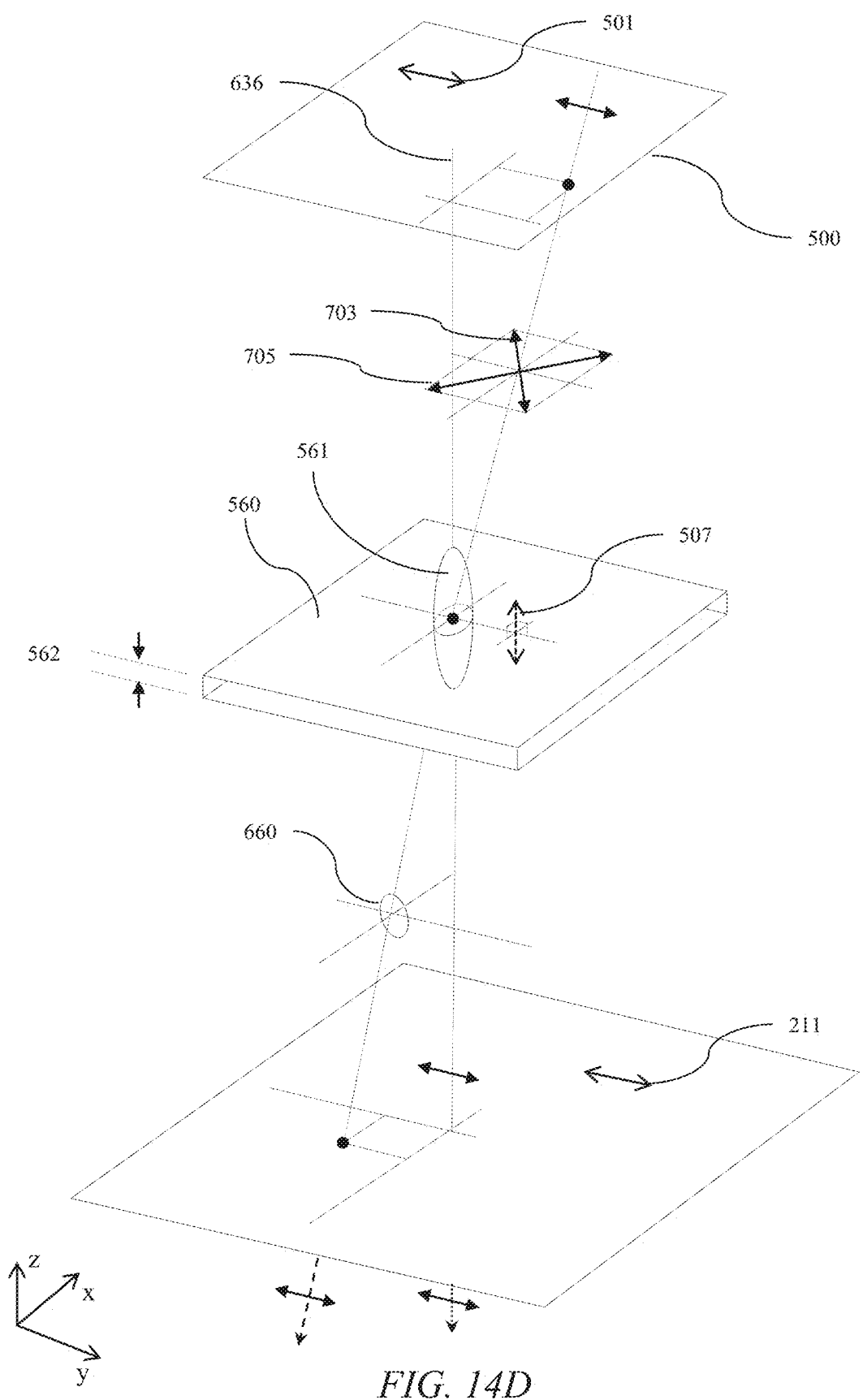
FIG. 14D is a diagram illustrating in perspective view illumination of a C-plate retarder by off-axis polarised light with a positive elevation and positive lateral angle.

FIG. 14D is a schematic diagram illustrating in perspective view illumination of a C-plate layer by off-axis polarised light with a positive elevation and positive lateral angle. In a similar manner to FIG. 14C, the polarisation component 704 is resolved into eigenstates 703, 705 that undergo a net phase difference, and elliptical polarisation component 660 is provided, which after transmission through the polarizer reduces the luminance of the respective off-axis ray. Thus, the polar control retarder 560 introduces a phase shift to polarisation components of light passed by the polarizer on the input side of the polar control retarder 560 along an axis that is inclined to a normal to the plane of the polar control retarder 560. Although FIG. 29D relates to the polar control retarder 560 that is passive, a similar effect is achieved by the polar control retarders described above, in a switchable state of the switchable liquid crystal polar control retarder corresponding to the privacy mode.

Figure 14E:
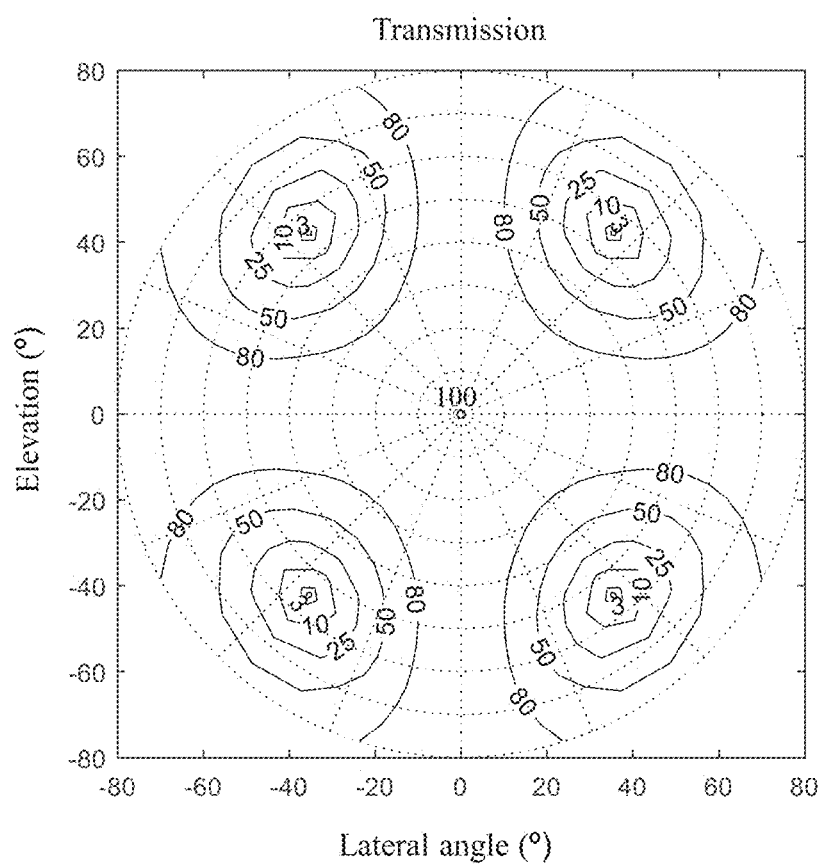
FIG. 14E is a graph illustrating the variation of output transmission with polar direction for transmitted light rays in FIGS. 14A-D.

FIG. 14E is a schematic graph illustrating the variation of output transmission with polar direction for transmitted light rays in FIGS. 14A-D. Thus, the C-plate may provide luminance reduction in polar quadrants. In combination with switchable liquid crystal layer 314 described elsewhere herein, (i) removal of luminance reduction of the C-plate may be provided in a first wide angle state of operation (ii) extended polar region for luminance reduction may be achieved in a second privacy state of operation.

To illustrate the off-axis behaviour of polar control retarder stacks, the angular luminance control of crossed A-plates 330A, 330B between an additional polarizer 318 and output display polarizer 218 will now be described for various off-axis illumination arrangements.

Figure 15A:
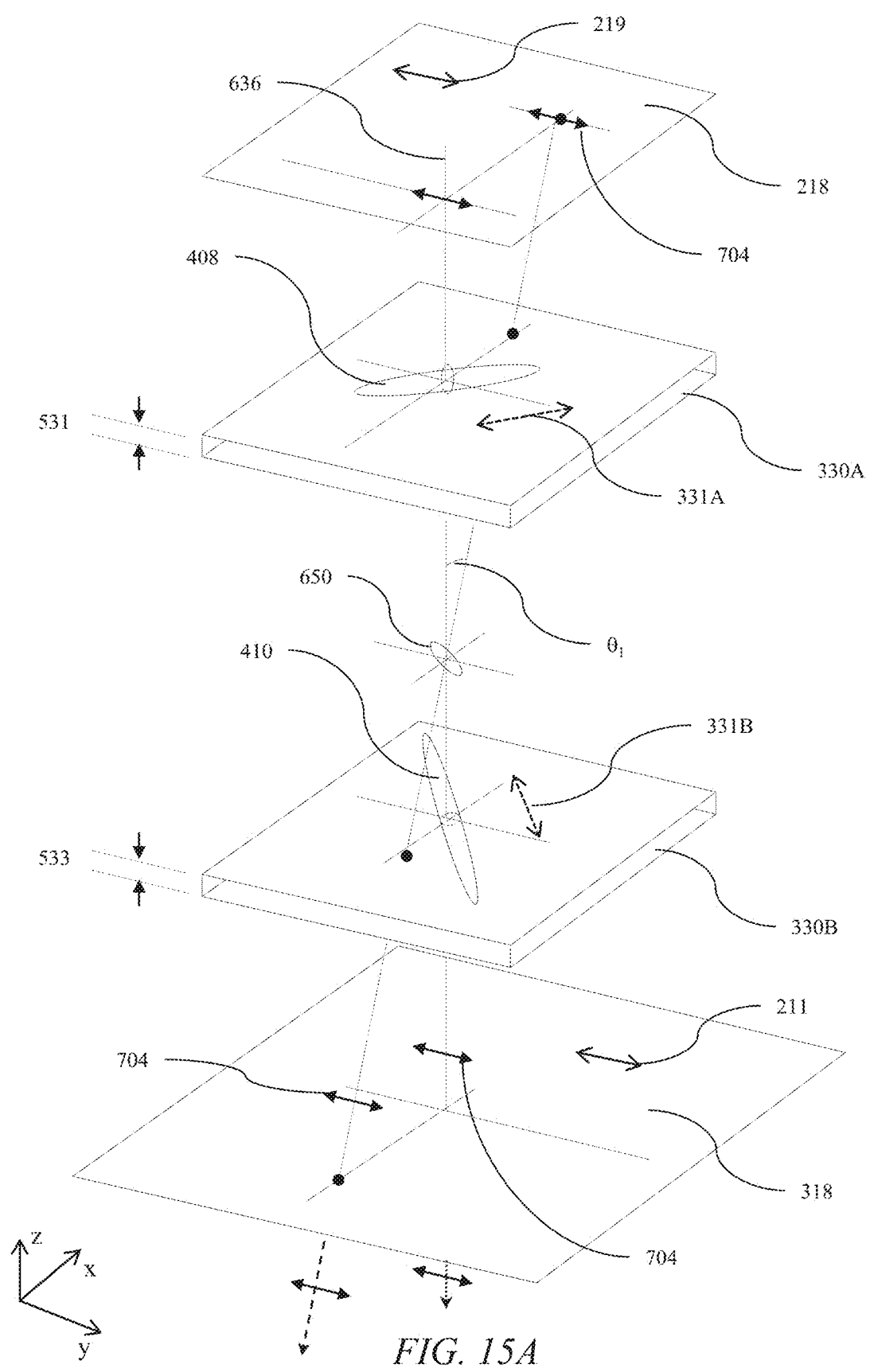
FIG. 15A is a diagram illustrating in perspective view illumination of crossed A-plate retarder layers by off-axis polarised light with a positive elevation.

FIG. 15A is a schematic diagram illustrating in perspective view illumination of crossed A-plate retarder layers by off-axis polarised light with a positive elevation. Linear polarizer 218 with electric vector transmission direction 219 is used to provide a linear polarisation state 704 that is parallel to the lateral direction onto first A-plate 330A of the crossed A-plates 330A, 330B. The optical axis direction 331A is inclined at +45 degrees to the lateral direction. The retardance of the polar control retarder 330A for the off-axis angle $\theta_1$ in the positive elevation direction provides a resultant polarisation component 650 that is generally elliptical on output. Polarisation component 650 is incident onto the second A-plate 330B of the crossed A-plates 330A, 330B that has an optical axis direction 331B that is orthogonal to the optical axis direction 331A of the first A-plate 330A. In the plane of incidence of FIG. 15A, the retardance of the second A-plate 330B for the off-axis angle $\theta_1$ is equal and opposite to the retardance of the first A-plate 330A. Thus a net zero retardation is provided for the incident polarisation component 704 and the output polarisation component is the same as the input polarisation component 704.

The output polarisation component is aligned to the electric vector transmission direction of the additional polarizer 318, and thus is transmitted efficiently. Advantageously substantially no losses are provided for light rays that have zero lateral angle angular component so that full transmission efficiency is achieved.

Figure 15B:
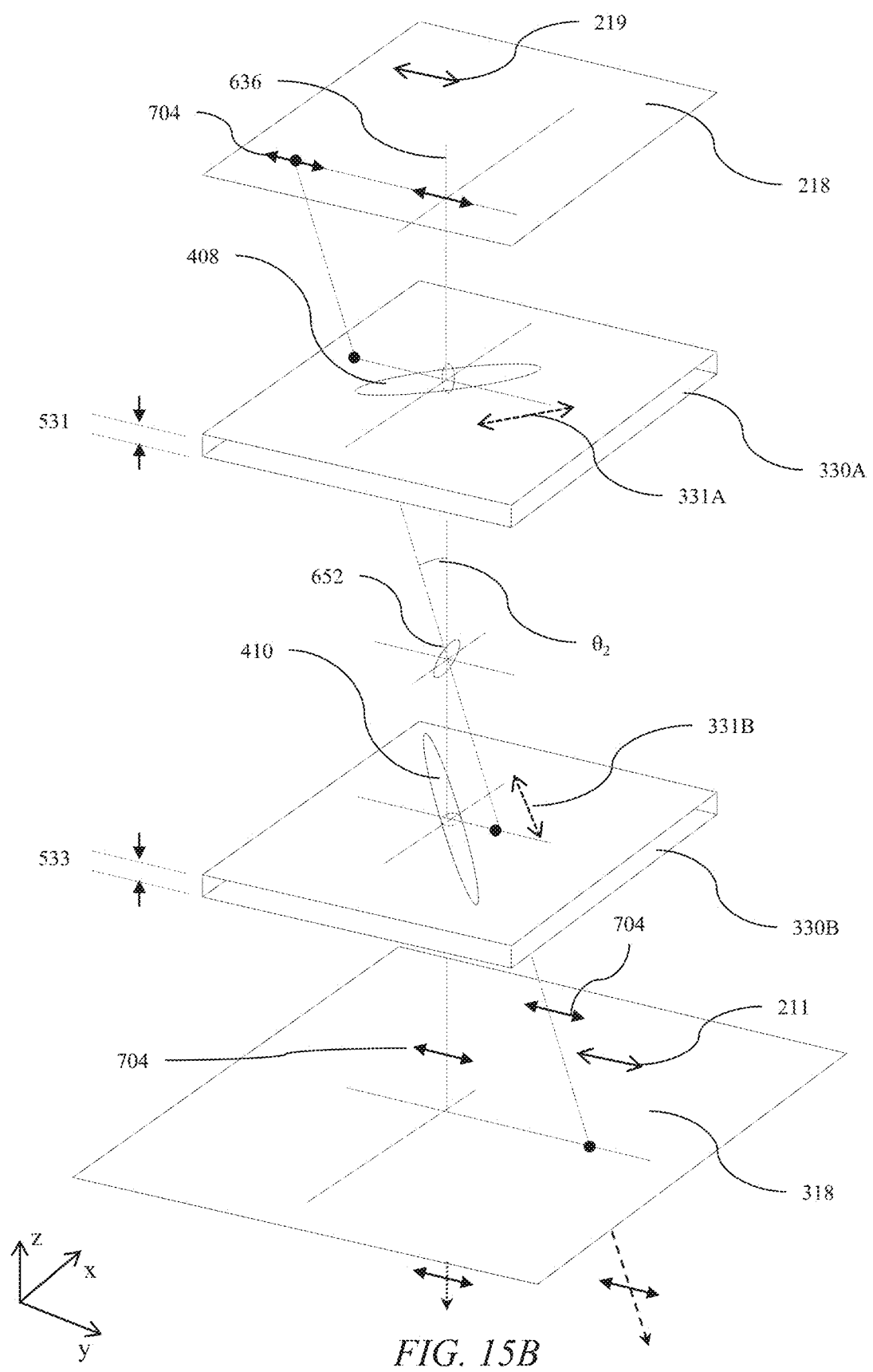
FIG. 15B is a diagram illustrating in perspective view illumination of crossed A-plate retarder layers by off-axis polarised light with a negative lateral angle.

FIG. 15B is a schematic diagram illustrating in perspective view illumination of crossed A-plate retarder layers by off-axis polarised light with a negative lateral angle. Thus input polarisation component is converted by the first A-plate 330A to an intermediate polarisation component 652 that is generally an elliptical polarisation state. The second A-plate 330B again provides an equal and opposite retardation to the first A-plate so that the output polarisation component is the same as the input polarisation component 704 and light is efficiently transmitted through the polarizer 318.

Thus the polar control retarder comprises a pair of retarders 330A, 330B which have optical axes in the plane of the retarders 330A, 330B that are crossed, that is the x-y plane in the present embodiments. The pair of retarders 330A, 330B have optical axes 331A, 331B that each extend at 45° with respect to an electric vector transmission direction that is parallel to the electric vector transmission of the polarizer 318.

Advantageously substantially no losses are provided for light rays that have zero elevation angular component so that full transmission efficiency is achieved.

Figure 15C:
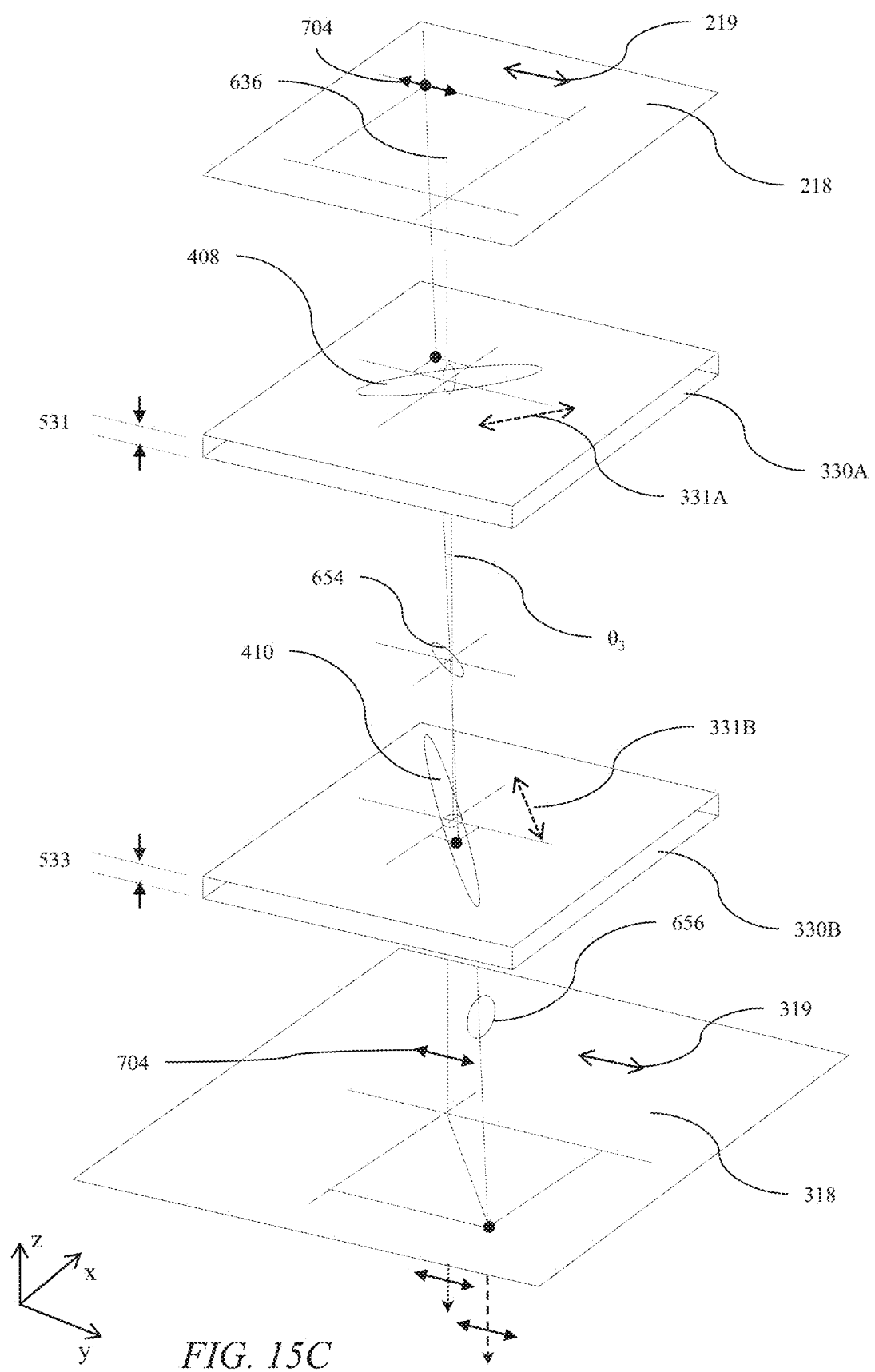
FIG. 15C is a diagram illustrating in perspective view illumination of crossed A-plate retarder layers by off-axis polarised light with a positive elevation and negative lateral angle.

FIG. 15C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 330A. A resultant elliptical component 656 is output from the second A-plate 330B. Elliptical component 656 is analysed by input polarizer 318 with reduced luminance in comparison to the input luminance of the first polarisation component 704.

Figure 15D:
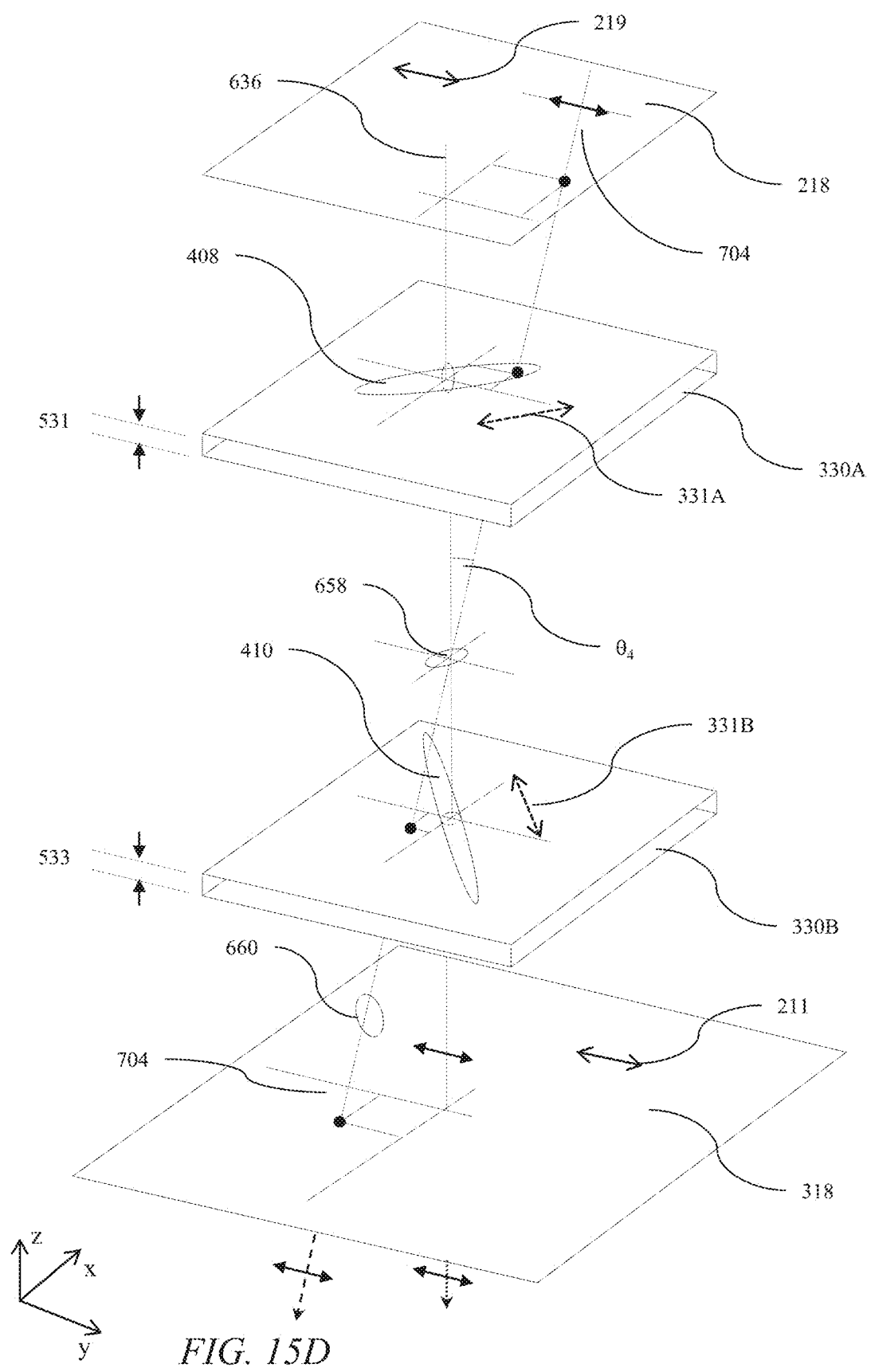
FIG. 15D is a diagram illustrating in perspective view illumination of crossed A-plate retarder layers by off-axis polarised light with a positive elevation and positive lateral angle.

FIG. 15D is a schematic diagram illustrating in perspective view illumination of crossed A-plate retarder layers by off-axis polarised light with a positive elevation and positive lateral angle. Polarisation components 658 and 660 are provided by first and second A-plates 330A, 330B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 15E:
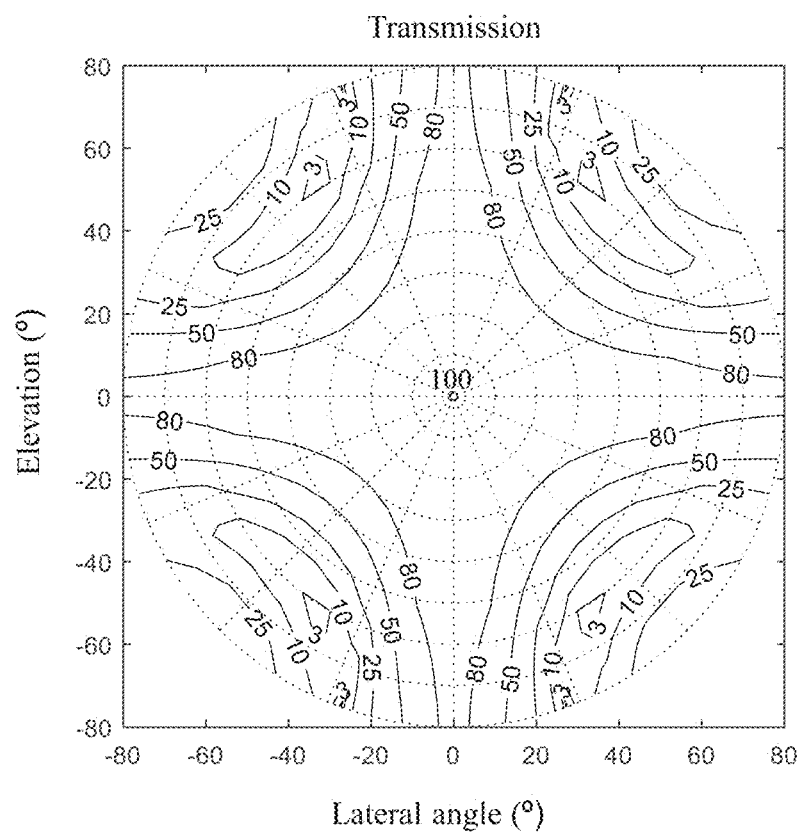
FIG. 15E is a graph illustrating the variation of output transmission with polar direction for transmitted light rays in FIGS. 15A-D.

FIG. 15E is a schematic graph illustrating the variation of output transmission with polar direction for transmitted light rays in FIGS. 15A-D. In comparison to the arrangement of FIG. 14E, the area of luminance reduction is increased for off-axis viewing. However, the switchable liquid crystal layer 314 may provide reduced uniformity in comparison to the C-plate arrangements for off-axis viewing in the first public mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
   a spatial light modulator;
   a display polariser arranged on a side of the spatial light modulator, the display polariser being a linear polariser;
   an additional polariser arranged on the same side of the spatial light modulator as the display polariser, the additional polariser being a linear polariser; and
   at least one polar control retarder arranged between the additional polariser and the display polariser,
   wherein the at least one polar control retarder comprises a switchable liquid crystal retarder comprising:
   first and second support substrates;
   a liquid crystal layer disposed between the first and second transparent support substrates, the liquid crystal layer comprising non-curable liquid crystal material and cured polymer material, wherein the cured polymer material comprises a cured liquid crystal material and is arranged to provide resistance to flow of non-curable liquid crystal material during application of applied force;
   electrodes arranged to apply a voltage for controlling the liquid crystal layer; and
   respective liquid crystal alignment layers supported on the first and second support substrates adjacent the liquid crystal layer for aligning the non-curable liquid crystal material,
   wherein
   the display device is configured such that application of a predetermined voltage to the electrodes is capable of causing the layer of cured liquid crystal material and non-curable liquid crystal material simultaneously to introduce no net relative phase shift to orthogonal polarisation components of light passed by the display polariser along a first axis and to introduce a net relative phase shift to orthogonal polarisation components of light passed by the additional polariser along a second axis inclined to the first axis, and
   the cured liquid crystal material has an alignment that is aligned with the alignment of the non-curable liquid crystal material in a state in which the predetermined voltage is applied to the electrodes.

2. A display device according to claim 1, wherein the cured liquid crystal material comprises a reactive mesogen.

3. A display device according to claim 1, wherein the first axis is along a normal to the plane of the at least one polar control retarder.

4. A display device according to claim 1, wherein the ratio of the volume of the cured polymer material to the volume of the non-curable liquid crystal material is less than 5%.

5. A display device according to claim 1, wherein the cured polymer material is arranged in a network that extends between the two support substrates.

6. A display device according to claim 5, wherein the network is attached to each of the two support substrates.

7. A display device according to claim 1, wherein the electrodes are disposed on opposite sides of the liquid crystal layer.

8. A display device according to claim 1, further comprising a control system arranged to control the voltage applied to the electrodes of the switchable liquid crystal retarder.

9. A display device according to claim 1, wherein the at least one polar control retarder further comprises at least one passive compensation retarder.

10. A display device according to claim 1, wherein the switchable liquid crystal retarder comprises two surface alignment layers disposed adjacent to the liquid crystal material on opposite sides thereof and each arranged to provide homeotropic alignment at the adjacent liquid crystal material.

11. A display device according to claim 10, wherein the layer of liquid crystal material of the switchable liquid crystal retarder comprises a liquid crystal material with a negative dielectric anisotropy.

12. A display device according to claim 10, wherein the layer of liquid crystal material has a retardance for light of a wavelength of 550 nm in a range from 500 nm to 1000 nm.

13. A display device according to claim 10, wherein:
   the at least one polar control retarder comprises at least one passive retarder having an optical axis perpendicular to the plane of the at least one passive retarder, the at least one passive retarder having a total retardance for light of a wavelength of 550 nm in a range from −300 nm to −900 nm; or
   the at least one polar control retarder comprises a pair of passive retarders which have optical axes in the plane of the passive retarders that are crossed, each passive retarder of the pair of passive retarders having a retardance for light of a wavelength of 550 nm in a range from 300 nm to 800 nm.

14. A display device according to claim 1, wherein the switchable liquid crystal retarder comprises two surface alignment layers disposed adjacent to the layer of liquid crystal material and on opposite sides thereof and each arranged to provide homogeneous alignment in the adjacent liquid crystal material.

15. A display device according to claim 14, wherein the layer of liquid crystal material of the switchable liquid crystal retarder comprises a liquid crystal material with a positive dielectric anisotropy.

16. A display device according to claim 14, wherein the layer of liquid crystal material has a retardance for light of a wavelength of 550 nm in a range from 500 nm to 900 nm.

17. A display device according to claim 14, wherein:
the at least one polar control retarder comprises at least one passive retarder having an optical axis perpendicular to the plane of the retarder, the at least one passive retarder having a total retardance for light of a wavelength of 550 nm in a range from −300 nm to −700 nm; or
the at least one polar control retarder comprises a pair of passive retarders which have optical axes in the plane of the retarders that are crossed, each passive retarder of the pair of passive retarders having a retardance for light of a wavelength of 550 nm in a range from 300 nm to 800 nm.

* * * * *